(12) United States Patent
Isobe et al.

(10) Patent No.: US 6,601,384 B2
(45) Date of Patent: Aug. 5, 2003

(54) CONTROL SYSTEM FOR INTERNAL COMBUSTION ENGINE

(75) Inventors: Takashi Isobe, Wako (JP); Kojiro Tsutsumi, Wako (JP); Manabu Niki, Wako (JP); Hiroyuki Ando, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/042,259

(22) Filed: Jan. 11, 2002

(65) Prior Publication Data

US 2002/0056272 A1 May 16, 2002

Related U.S. Application Data

(62) Division of application No. 09/708,685, filed on Nov. 9, 2000.

(30) Foreign Application Priority Data

Sep. 11, 1999 (JP) .......................... 11-317562
Sep. 11, 1999 (JP) .......................... 11-317563
Sep. 11, 1999 (JP) .......................... 11-317564

(51) Int. Cl.$^7$ ............................... F01N 3/00
(52) U.S. Cl. ..................... 60/285; 60/277; 60/284; 123/339.11
(58) Field of Search ................. 60/274, 277, 284, 60/285, 300; 123/339.11, 339.12

(56) References Cited

U.S. PATENT DOCUMENTS 5,224,335 A * 7/1993 Yoshizaki .................. 60/277
5,950,419 A * 9/1999 Nishimura et al. ........... 60/284
6,189,317 B1 * 2/2001 Yasui et al. .................... 60/284
6,212,879 B1 * 4/2001 Nishimura et al. ........... 60/274
6,212,884 B1 * 4/2001 Ohuchi et al. ................. 60/284
6,367,446 B1 * 4/2002 Kanamaru et al. ...... 123/339.12

FOREIGN PATENT DOCUMENTS

JP          10-299631         11/1998

* cited by examiner

Primary Examiner—Thomas Denion
Assistant Examiner—Tu M. Nguyen
(74) Attorney, Agent, or Firm—Arent Fox Kintner Plotkin & Kahn

(57) ABSTRACT

A control system is disclosed that accelerates the rise in temperature of a catalyst provided in an exhaust system of an internal combustion engine. The system increases the intake air amount after the engine starts and retards the ignition timing according to a rotational speed of the engine. In this control system, a failure of the catalyst temperature rise acceleration control is diagnosed according to the engine rotational speed and/or a retard amount of the ignition timing during the execution of the catalyst temperature rise acceleration control. The above failure may also be diagnosed according to at least one of the ignition timing and the engine rotational speed when decreasing the intake air amount during the execution of the catalyst temperature rise acceleration control. The above failure may also be diagnosed according to a detected catalyst temperature and an estimated catalyst temperature.

6 Claims, 24 Drawing Sheets

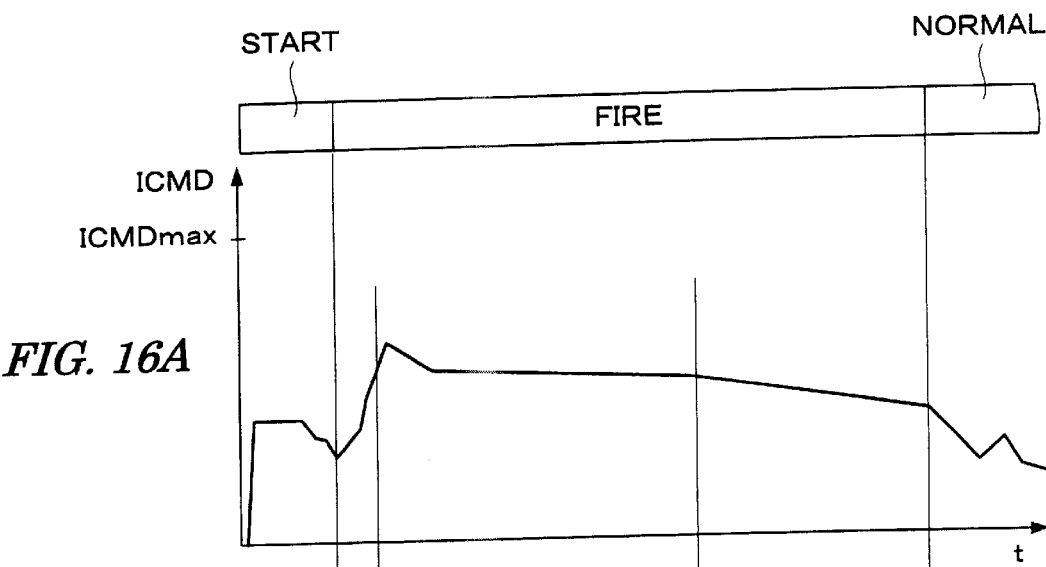
FIG. 16A
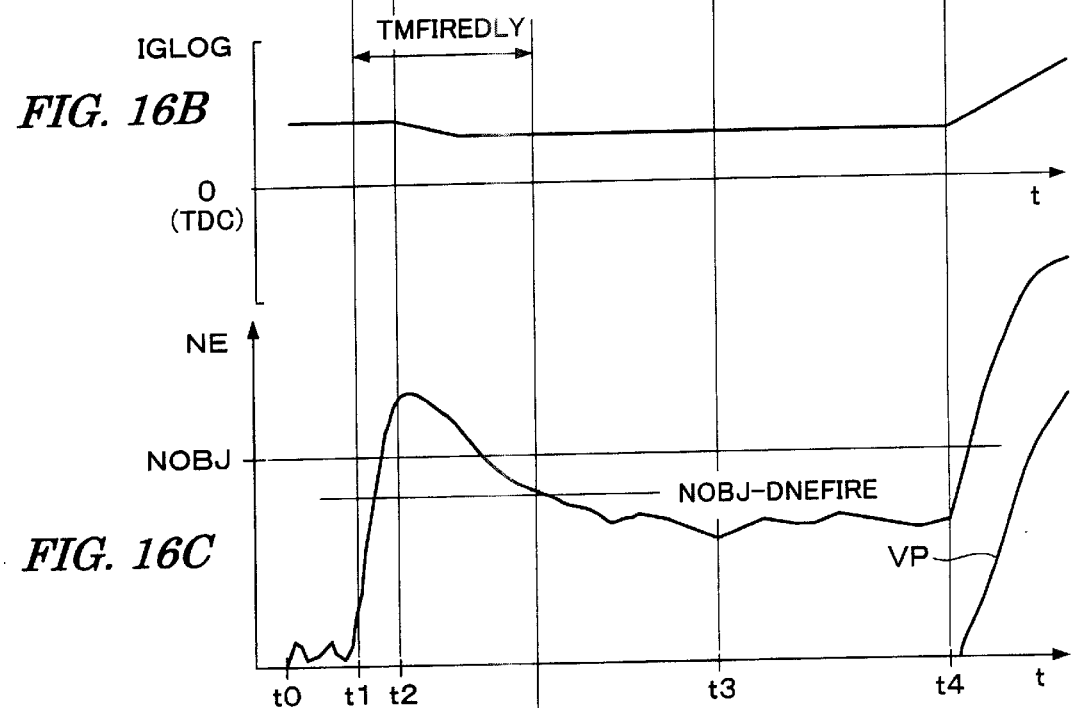
FIG. 16B
FIG. 16C
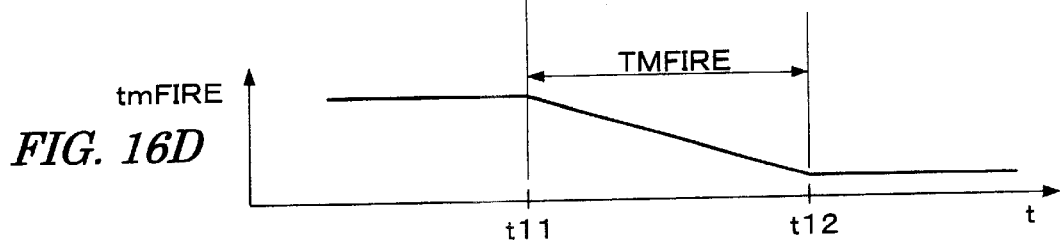
FIG. 16D

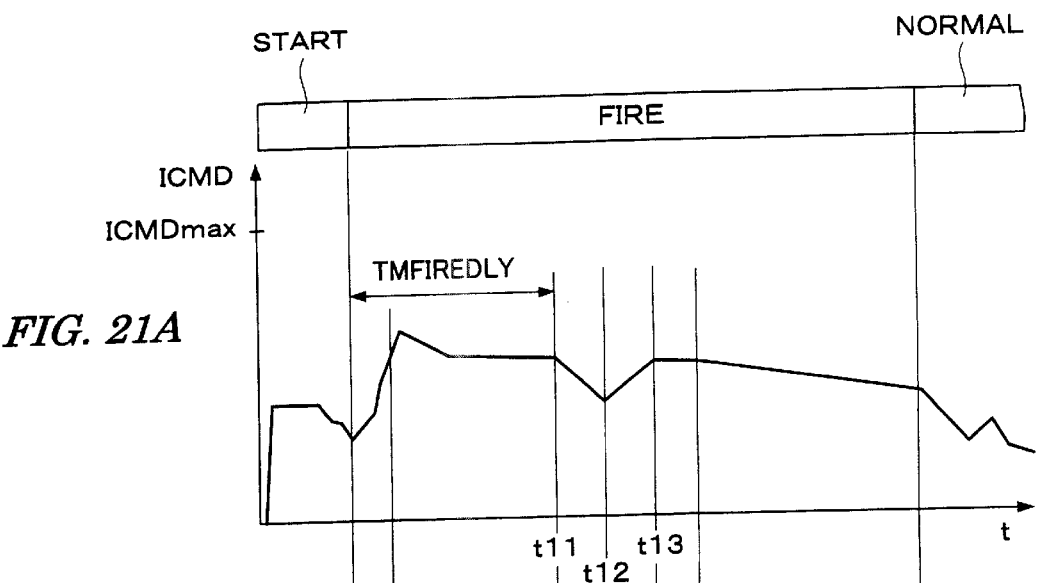
FIG. 21A
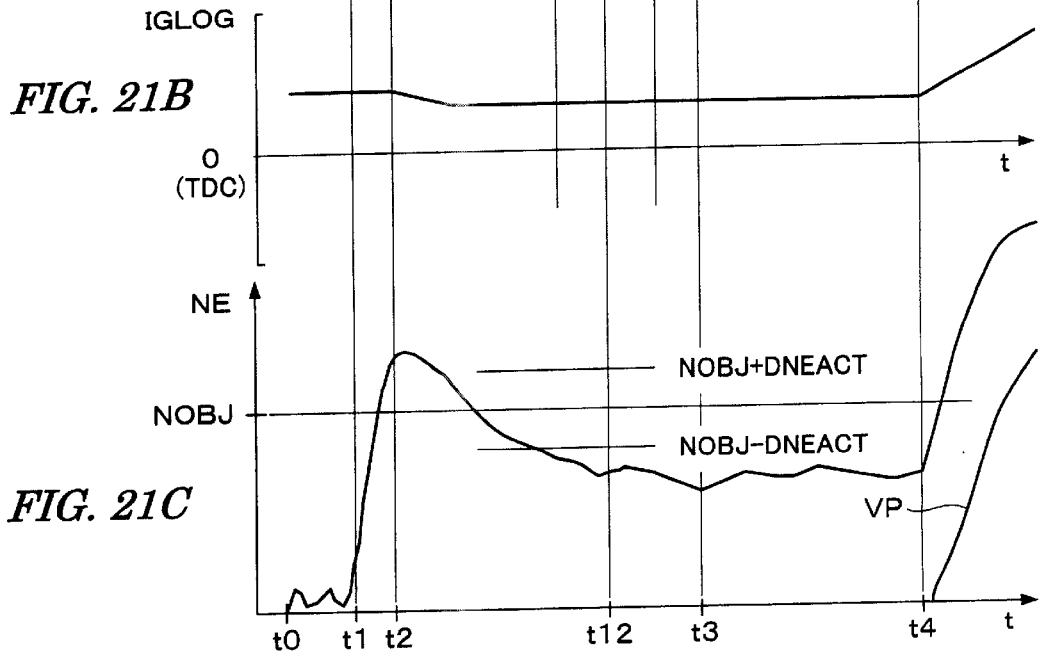
FIG. 21B
FIG. 21C

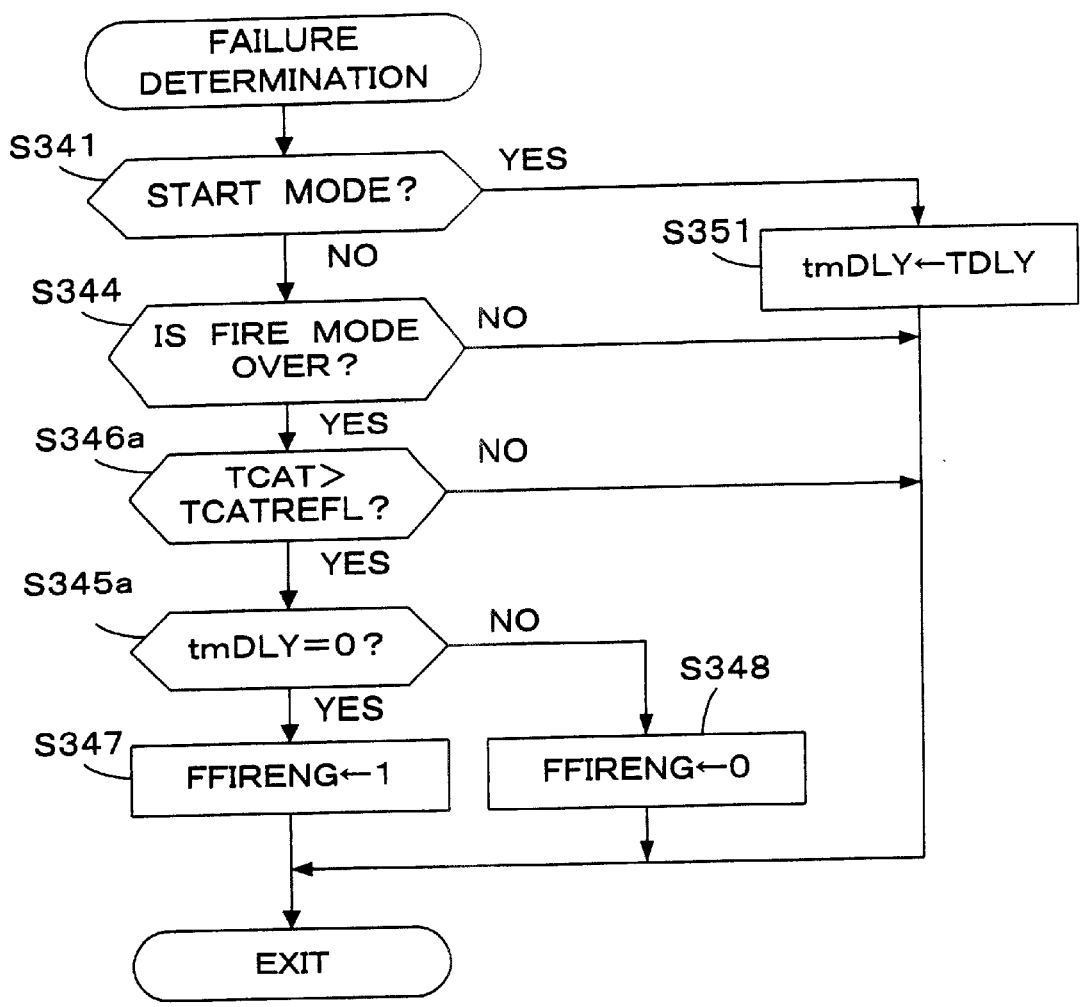

CONTROL SYSTEM FOR INTERNAL COMBUSTION ENGINE

This is a divisional of Application No. 09/708,685 filed Nov. 9, 2000.

BACKGROUND OF THE INVENTION

The present invention relates to a control system for an internal combustion engine that performs catalyst temperature rise acceleration control for accelerating a rise in temperature of a catalyst for exhaust gas purification, and more particularly to such a control system having a function of diagnosing a failure to properly perform the catalyst temperature rise acceleration control.

A catalyst for exhaust gas purification is provided in the exhaust system of an internal combustion engine. This catalyst is inactive at low temperatures. Consequently, the catalyst does not purify the exhaust gas at low temperatures. Therefore, it is desirable to rapidly raise the temperature of the catalyst, immediately after starting the engine, to activate the catalyst.

Known in the art is a technique for accelerating the rise in temperature of the catalyst. This technique increases the intake air amount immediately after starting of the engine as compared with the air intake amount at normal idling of the engine. The technique also controls the ignition timing in a retarding direction so that the rotational speed of the engine coincides with a target rotational speed (Japanese Patent Laid-open No. 10-299631). According to this technique, the fuel supply amount increases with the increase in the intake air amount. Thus, the combustion heat increases immediately after starting of the engine as compared with that at normal idling. The immediate combustion heat increase enables the acceleration of the temperature rise in the catalyst.

However, the above-mentioned conventional technique makes no provision for detecting a failure to execute instructions from the control unit. For example, a failure to increase the intake air amount and/or a failure to change the ignition timing to the retard side are not detected. Accordingly, in the event that such a failure has occurred, the driver may not notice the failure, causing a deterioration in exhaust emission characteristics immediately after starting of the engine.

SUMMARY OF THE INVENTION

It is accordingly an object of the present invention to provide a control system for an internal combustion engine that can diagnose a failure to execute the catalyst temperature rise acceleration control, including the increase in the intake air amount and the retard control of the ignition timing in combination, and thereby minimize a deterioration in exhaust emission characteristics.

In accordance with an aspect of the present invention, there is provided a control system for an internal combustion engine having an exhaust system provided with a catalyst, comprising intake air amount control means for controlling an intake air amount to the engine, ignition timing control means for controlling an ignition timing of the engine, catalyst temperature raising means for increasing the intake air amount after starting of the engine and for retarding the ignition timing according to a rotational speed of the engine, and failure diagnosing means for diagnosing a failure of the catalyst temperature raising means according to at least one of the rotational speed of the engine and a retard amount of the ignition timing during the operation of the catalyst temperature raising means.

With this configuration, the failure of the catalyst temperature raising means is diagnosed according to at least one of the rotational speed of the engine and a retard amount of the ignition timing during the operation of the catalyst temperature raising means. Accordingly, any failure in the catalyst temperature raising means can be diagnosed early to thereby minimize a deterioration in exhaust characteristics.

Preferably, the failure diagnosing means determines that the catalyst temperature raising means has failed when the rotational speed of the engine after the elapse of a predetermined time period from the time of starting the operation of the catalyst temperature raising means is less than or equal to a predetermined rotational speed.

Preferably, the failure diagnosing means determines that the catalyst temperature raising means has failed when the retard amount of the ignition timing after the elapse of a predetermined time period from the time of starting the operation of the catalyst temperature raising means is less than or equal to a predetermined retard amount.

Preferably, the failure diagnosing means diagnoses the failure of the catalyst temperature raising means according to a crank angle position at which the rotational speed of the engine during the operation of the catalyst temperature raising means becomes maximum.

With this configuration, the failure of the catalyst temperature raising means is diagnosed according to the crank angle position at which the engine rotational speed during the operation of the catalyst temperature raising means becomes maximum. Accordingly, the failure can be determined from the result of determination whether or not the retard control of the ignition timing is accurately performed from a crank angle position at which ignition actually occurs. Accordingly, it is also possible to determine such a failure when an actual ignition timing is different from a generation timing of an ignition timing control signal.

Preferably, the failure diagnosing means diagnoses the failure of the catalyst temperature raising means according to an amount of change in the ignition timing during the operation of the catalyst temperature raising means.

With this configuration, the failure of the catalyst temperature raising means is diagnosed according to an amount of change in the ignition timing during the operation of the catalyst temperature raising means. Accordingly, the determination can be accurately performed even in the case that the ignition timing is generally shifted to the advance side or the retard side.

Preferably, the control system further includes intake air temperature detecting means for detecting an intake air temperature to the engine and coolant temperature detecting means for detecting a coolant temperature of the engine, wherein the failure diagnosis by the failure diagnosing means is inhibited when the difference between the detected coolant temperature and the detected intake air temperature is greater than or equal to a predetermined temperature.

Preferably, the control system further includes load detecting means for detecting a load on the engine, wherein the failure diagnosis by the failure diagnosing means is inhibited when the detected load is less than a predetermined value.

Preferably, the catalyst temperature raising means operates when the rotational speed of the engine is greater than or equal to a predetermined lower-limit rotational speed and the engine is in an idling condition.

Preferably, the control system further includes coolant temperature detecting means for detecting a coolant temperature of the engine, wherein an operating time period of the catalyst temperature raising means is set according to the detected coolant temperature at starting of the engine.

Preferably, the catalyst temperature raising means sets the retard amount of the ignition timing so that the rotational speed of the engine coincides with a target rotational speed.

In accordance with another aspect of the present invention, there is provided a control system for an internal combustion engine having an exhaust system provided with a catalyst, comprising intake air amount control means for controlling an intake air amount to the engine, ignition timing control means for controlling an ignition timing of the engine, catalyst temperature raising means for increasing the intake air amount after starting of the engine and for retarding the ignition timing according to a rotational speed of the engine, and failure diagnosing means for diagnosing a failure of the catalyst temperature raising means according to at least one of the ignition timing and the rotational speed of the engine when decreasing the intake air amount during the operation of the catalyst temperature raising means.

With this configuration, the failure of the catalyst temperature raising means is diagnosed according to at least one of the ignition timing and the engine rotational speed when decreasing the intake air amount during the operation of the catalyst temperature raising means. Accordingly, any failure in the catalyst temperature raising means can be diagnosed early to thereby minimize a deterioration in exhaust characteristics.

Preferably, the failure diagnosing means determines that the catalyst temperature raising means has failed when the absolute value of the difference between the rotational speed of the engine and a predetermined rotational speed is greater than a predetermined value.

Preferably, the failure diagnosing means determines that the catalyst temperature raising means has failed when an amount of change in the ignition timing is less than a predetermined amount.

In accordance with a further aspect of the present invention, there is provided a control system for an internal combustion engine having an exhaust system provided with a catalyst, comprising intake air amount control means for controlling an intake air amount to the engine, ignition timing control means for controlling an ignition timing of the engine, catalyst temperature raising means for increasing the intake air amount after starting of the engine and for retarding the ignition timing according to a rotational speed of the engine, catalyst temperature detecting means for detecting a temperature of the catalyst, catalyst temperature estimating means for estimating a temperature of the catalyst, and failure diagnosing means for diagnosing a failure of the catalyst temperature raising means according to the temperature detected by the catalyst temperature detecting means and the temperature estimated by the catalyst temperature estimating means.

With this configuration, the failure of the catalyst temperature raising means is diagnosed according to the catalyst temperature detected by the catalyst temperature detecting means and the catalyst temperature estimated by the catalyst temperature estimating means. Accordingly, any failure in the catalyst temperature raising means can be diagnosed early to thereby minimize a deterioration in exhaust characteristics.

Preferably, the catalyst temperature estimating means estimates the temperature of the catalyst according to an accumulated value of the intake air amount after starting of the engine.

Preferably, the catalyst temperature estimating means estimates the temperature of the catalyst according to an elapsed time period after starting of the engine.

Preferably, the failure diagnosing means determines that the catalyst temperature raising means has failed when the absolute value of the difference between the temperature detected by the catalyst temperature detecting means and the temperature estimated by the catalyst temperature estimating means is greater than a predetermined value.

BRIEF DESCRIPTION OF THE DRAWINGS

FIGS. 16A to 16D are time charts for illustrating an example of the operation when the catalyst temperature rise acceleration control is not properly executed according to the first preferred embodiment;

FIGS. 21A to 21C are time charts for illustrating an example of the operation when the catalyst temperature rise acceleration control is not properly executed according to the second preferred embodiment;

FIG. 27 is a flowchart for illustrating a modification of the processing shown in FIG. 25.

DETAILED DESCRIPTION OF THE PREFERRED EMBODIMENTS

Some preferred embodiments of the present invention will now be described with reference to the drawings.

First Preferred Embodiment

Figure 1:
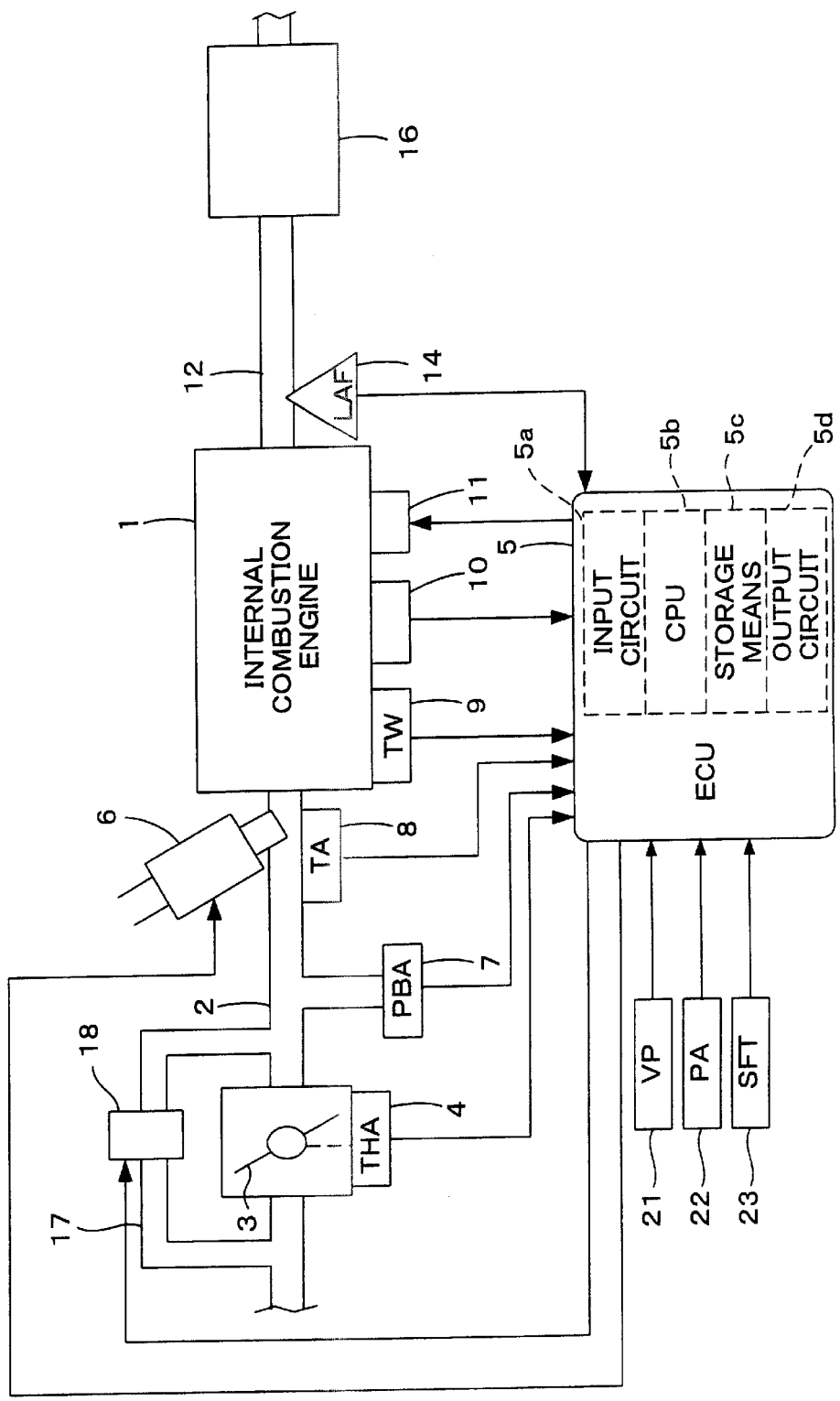
FIG. 1 is a schematic diagram showing the configuration of an internal combustion engine and a control system therefor according to a first preferred embodiment of the present invention.

Referring to FIG. 1, there is schematically shown a general configuration of an internal combustion engine (which will be hereinafter referred to as "engine") and a control system therefor according to a preferred embodiment of the present invention. The engine 1 is a four-cylinder engine, for example, and it has an intake pipe 2 provided with a throttle valve 3. A throttle valve opening (THA) sensor 4 is connected to the throttle valve 3, so as to output an electrical signal corresponding to an opening angle of the throttle valve 3 and supply the electrical signal to an electronic control unit (which will be hereinafter referred to as "ECU") 5.

An auxiliary air passage 17 bypassing the throttle valve 3 is connected to the intake pipe 2. The auxiliary air passage 17 is provided with an auxiliary air control valve 18 for controlling an auxiliary air amount. The auxiliary air control valve 18 is connected to the ECU 5, and its valve opening amount is controlled by the ECU 5.

A fuel injection valve 6 is provided for each cylinder so as to inject fuel into the intake pipe 2. Thus, four fuel injection valves 6 would be respectively provided for a four cylinder engine. The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 7 is provided immediately downstream of the throttle valve 3. An absolute pressure signal converted to an electrical signal by the absolute intake pressure sensor 7 is supplied to the ECU 5. An intake air temperature (TA) sensor 8 is provided downstream of the absolute intake pressure sensor 7 to detect an intake air temperature TA. An electrical signal corresponding to the detected intake air temperature TA is output from the sensor 8 and supplied to the ECU 5.

An engine coolant temperature (TW) sensor 9 such as a thermistor is mounted on the body of the engine 1 to detect an engine coolant temperature (cooling water temperature) TW. A temperature signal corresponding to the detected engine coolant temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor for outputting a signal pulse at a predetermined crank angle position for a specific cylinder of the engine 1 (this signal pulse will be hereinafter referred to as "CYL signal pulse"). The crank angle position sensor 10 also consists of a TDC sensor for outputting a TDC signal pulse at a crank angle position before a top dead center (TDC) by a predetermined crank angle starting at an intake stroke in each cylinder (at every 180 deg crank angle in the case of a four-cylinder engine), and a CRK sensor for generating one pulse with a constant crank angle period (e.g., a period of 30 deg) shorter than the period of generation of the TDC signal pulse (this pulse will be hereinafter referred to as "CRK signal pulse"). The CYL signal pulse, the TDC signal pulse, and the CRK signal pulse are supplied to the ECU 5. These signal pulses are used to control the various timings, such as fuel injection timing and ignition timing, and for detection of an engine rotational speed NE.

Each cylinder of the engine 1 is provided with a spark plug 11. The spark plug 11 is connected to the ECU 5, and a drive signal for the spark plug 11, i.e., an ignition signal, is supplied from the ECU 5 to the spark plug 11.

An exhaust pipe 12 of the engine 1 is provided with a three-way catalyst 16 for removing components such as HC, CO, and NOx in exhaust gases. A proportional type air-fuel ratio sensor (which will be hereinafter referred to as "LAF sensor") 14 is mounted on the exhaust pipe 12 at a position upstream of the three-way catalyst 16. The LAF sensor 14 outputs a detection signal substantially proportional to the oxygen concentration (air-fuel ratio) in the exhaust gases, and supplies the detection signal to the ECU 5.

A vehicle speed sensor 21 for detecting a running speed (vehicle speed) VP of a vehicle driven by the engine 1 is connected to the ECU 5. An atmospheric pressure sensor 22 for detecting an atmospheric pressure PA is also connected to the ECU 5. A shift position sensor 23 for detecting a shift position of an automatic transmission in the vehicle is also connected to the ECU 5. Detection signals output from these sensors 21, 22, and 23 are supplied to the ECU 5.

The ECU 5 includes an input circuit 5a having various functions including a function of shaping the waveforms of input signals from the various sensors, a function of correcting the voltage levels of the input signals to a predetermined level, and a function of converting analog signal values into digital signal values. ECU 5 also includes a central processing unit (which will be hereinafter referred to as "CPU") 5b and storage means 5c. Storage means 5c preliminarily stores various operational programs to be executed by the CPU 5b and stores the results of computation or the like made by the CPU 5b. Additionally, ECU5 includes an output circuit 5d for supplying drive signals to the fuel injection valves 6, the spark plugs 11, etc.

The CPU 5b determines various engine operating conditions according to various engine parameter signals as mentioned above, and calculates a fuel injection period TOUT for each fuel injection valve 6 to be opened in synchronism with the TDC signal pulse, in accordance with Eq. (1) and according to the above determined engine operating conditions.

$$TOUT = TI \times KCMD \times KLAF \times K1 + K2 \qquad (1)$$

TI is a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. Accordingly, the basic fuel injection period TI has values proportional to an intake air amount per unit time. Thus, an accumulated intake air amount parameter GAIRSUM to be hereinafter described can be obtained by accumulating the basic fuel injection period TI.

KCMD is a target air-fuel ratio coefficient, which is set according to engine operational parameters such as the engine rotational speed NE, the absolute intake pressure PBA, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio, so KCMD is also referred to as a target equivalent ratio.

KLAF is an air-fuel ratio correction coefficient calculated by PID (proportional integral differential) control so that a detected equivalent ratio KACT calculated from a detected value output from the LAF sensor 14 becomes equal to the target equivalent ratio KCMD.

The CPU 5b further calculates an ignition timing IGLOG in accordance with Eq. (2).

$$IGLOG = IGMAP + IGCR + IGFPI \qquad (2)$$

IGMAP is a basic value of the ignition timing obtained by retrieving an IG map set according to the engine rotational speed NE and the absolute intake pressure PBA. The ignition timing is indicated by an advance amount from a top dead center.

IGFPI is a retard correction term set to a negative value so that the engine rotational speed NE becomes equal to a target rotational speed NEFIR in executing rapid warm-up retard control during warming up of the engine 1.

IGCR is a correction term other than the retard correction term IGFPI. (IGMAP+IGCR) corresponds to an ignition timing in the case of normal control without the execution of the rapid warm-up retard control.

In the following description, an operational mode in which the rapid warm-up retard control is executed will be referred to as "FIRE mode".

The CPU 5b supplies a signal for driving each fuel injection valve 6 according to the fuel injection period TOUT obtained above to each fuel injection valve 6, and also supplies a signal for driving each spark plug 11 according to the ignition timing IGLOG obtained above. Further, the CPU 5b calculates a valve opening control amount ICMD for controlling the valve opening amount of the auxiliary air control valve 18 according to engine operating conditions, and supplies a drive signal corresponding to the valve opening control amount ICMD calculated above to the auxiliary air control valve 18. In the FIRE mode (and in a transient state immediately after the end of the FIRE mode), the CPU 5b calculates the valve opening control amount ICMD in accordance with Eq. (3). The amount of air supplied through the auxiliary air control valve 18 into the engine 1 is proportional to the valve opening control amount ICMD.

$$ICMD = (IFIR + ILOAD) \times KIPA + IPA \qquad (3)$$

IFIR is a FIRE mode control term used in the FIRE mode (and in the transient state immediately after the end of the FIRE mode).

ILOAD is a load correction term set according to whether various loads such as an electrical load, a compressor load of an air conditioner, and a power steering load on the engine 1 are ON or OFF or whether or not the automatic transmission is in an in-gear condition.

KIPA and IPA are an atmospheric pressure correction coefficient and an atmospheric pressure correction term both set according to the atmospheric pressure PA, respectively.

Figure 2:
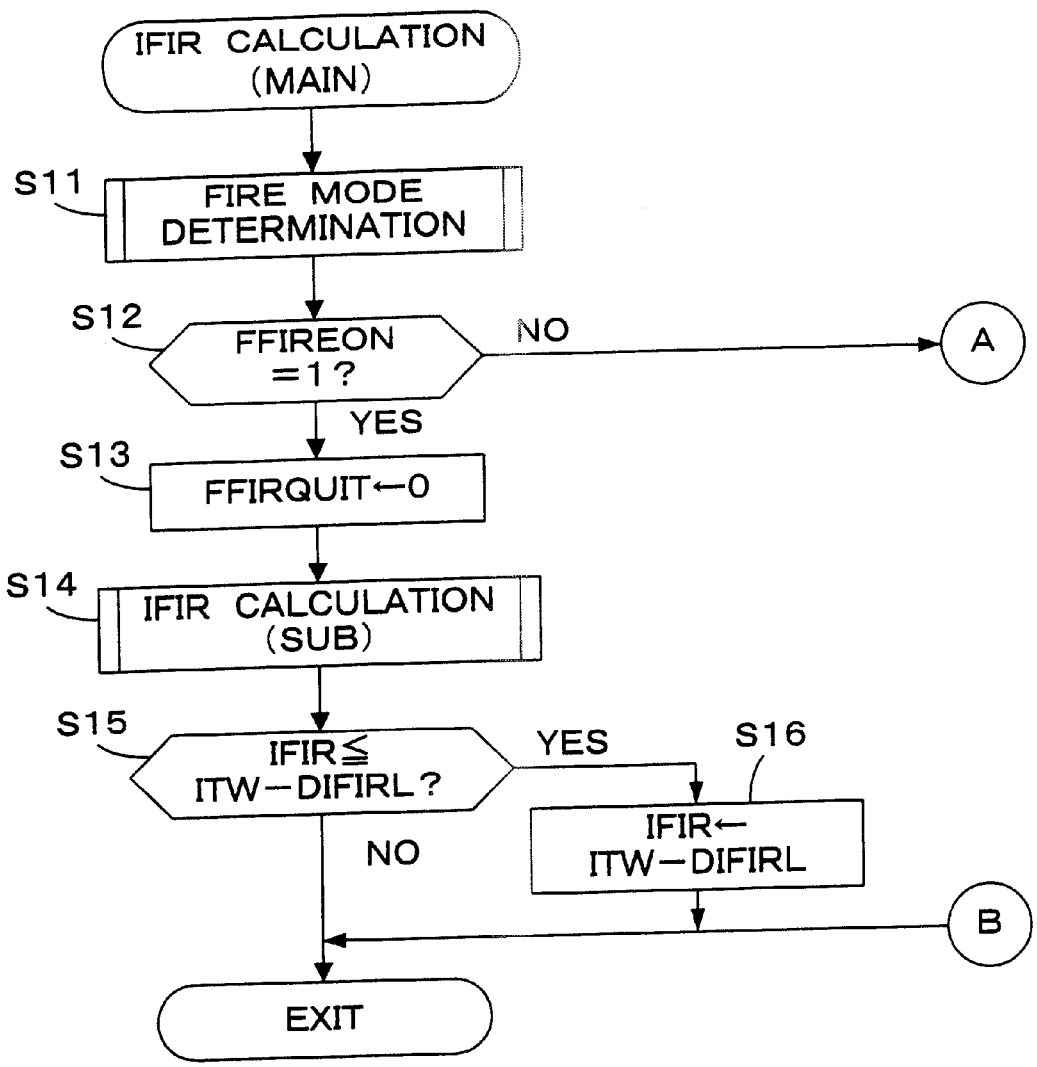
FIGS. 2 and 3 are flowcharts showing a main routine for calculation of a control amount (IFIR) of an auxiliary air control valve according to the first preferred embodiment.
Figure 3:
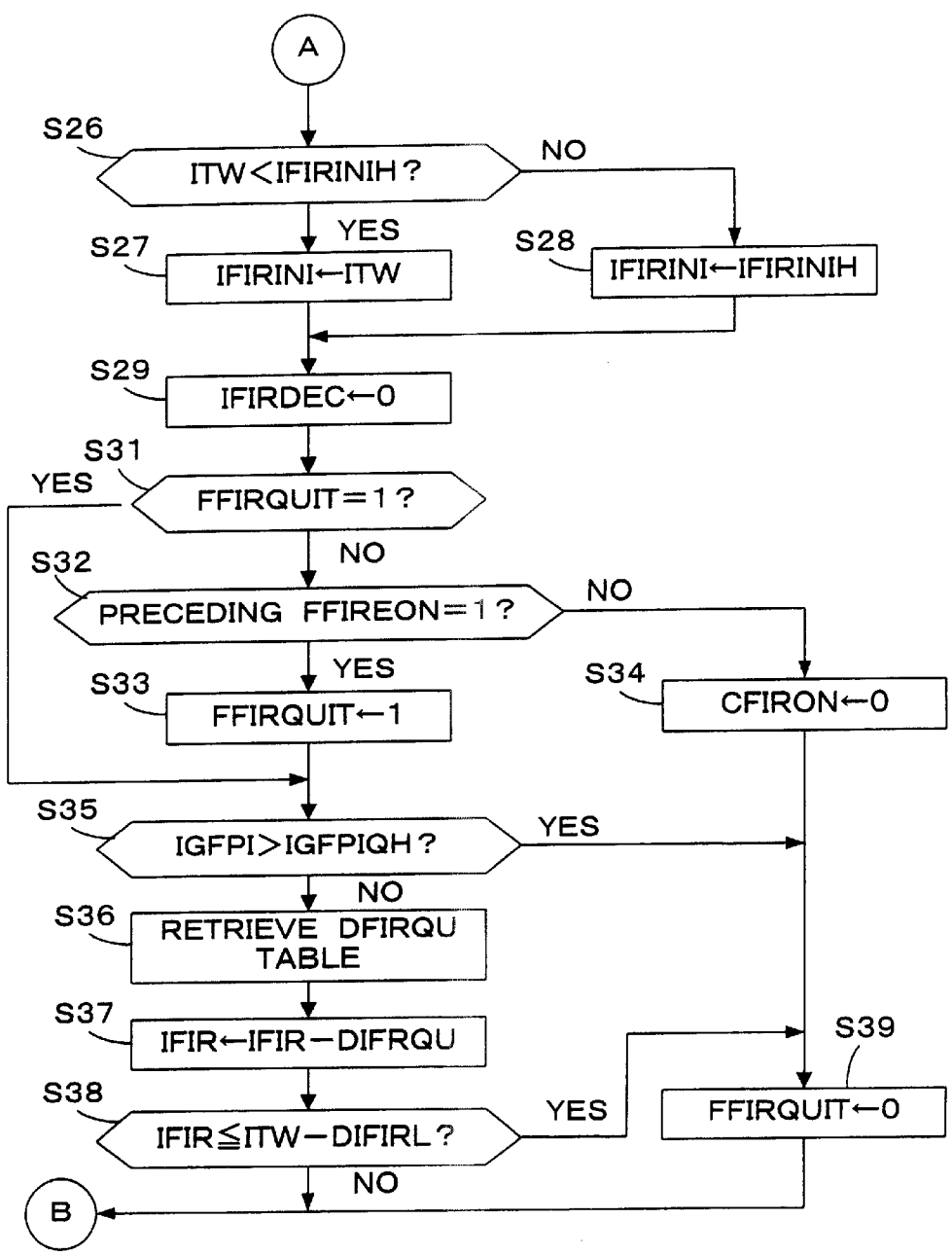

FIGS. 2 and 3 are flowcharts showing a main routine for calculation of the FIRE mode control term IFIR in the FIRE mode and immediately after the end of the FIRE mode. This routine is executed in synchronism with the generation of a TDC signal pulse in the CPU 5b.

Figure 5:
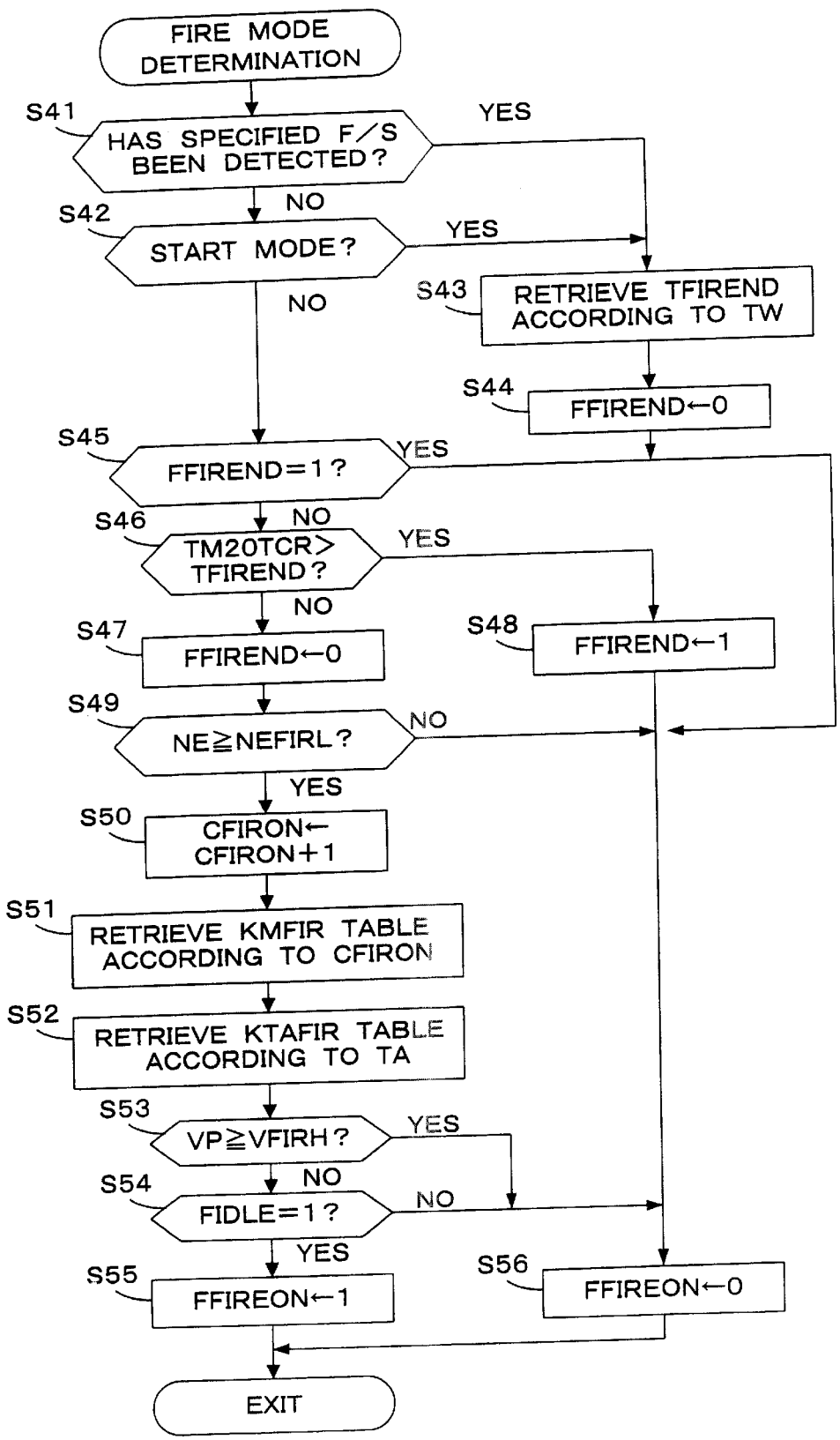
FIG. 5 is a flowchart showing a program for determining whether or not catalyst temperature rise acceleration control is to be executed.

In step S11, FIRE mode determination processing shown in FIG. 5 is executed. The FIRE mode determination processing includes steps of setting a FIRE mode flag FFIREON to "1", indicating permission to transition to the FIRE mode or continuation of the FIRE mode.

Figure 7:
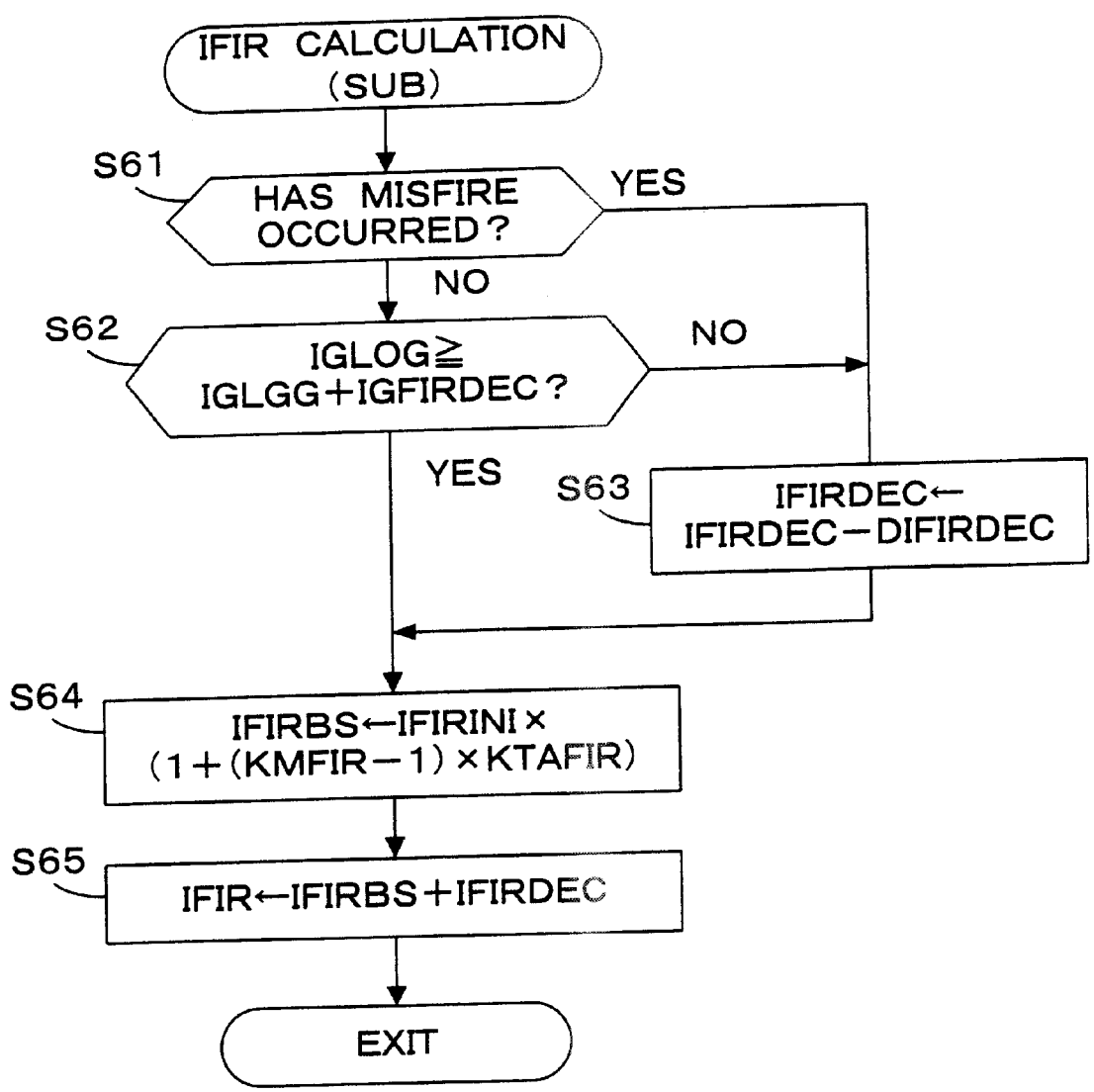
FIG. 7 is a flowchart showing a subroutine for calculation of the control amount (IFIR) of the auxiliary air control valve.

In step S12, it is determined whether or not the FIRE mode flag FFIREON is "1". If FFIREON is "0", which indicates that the transition to the FIRE mode or the continuation of the FIRE mode is not allowed, then the program proceeds to step S26 (FIG. 3). When FFIREON is "1", a transient control flag FFIRQUIT is set to "0" (step S13), and an IFIR calculation subroutine shown in FIG. 7 is executed (step S14). The transient control flag FFIRQUIT of "1" indicates the duration of execution of transient control immediately after the end of the FIRE mode. Thereafter, it is determined whether or not the FIRE mode control term IFIR calculated in step S14 is less than or equal to a lower limit obtained by subtracting DIFIRL from ITW. DIFIRL is a predetermined value for lower limit setting (e.g., a value corresponding to an air amount of 100 liters/min). ITW is an engine coolant temperature control term set according to the engine coolant temperature TW. The engine coolant temperature control term ITW is a control term used for control of the auxiliary air control valve 18 in an engine operating condition such as an idling operation other than the FIRE mode (step S15). If IFIR is greater than ITW minus DIFIRL, the program is ended. When IFIR is less than or equal to ITW minus DIFIRL, the FIRE mode control term IFIR is set to the lower limit (ITW−DIFIRL) (step S16) and the program is then ended.

In step S26 shown in FIG. 3, it is determined whether or not the engine coolant temperature control term ITW is less than an upper limit initial value IFIRINIH (e.g., a value corresponding to an intake air amount of 600 liters/min). If ITW is less than IFIRINIH, an initial value IFIRINI, used in step S64 shown in FIG. 7, is set to the engine coolant temperature control term ITW (step S27). When ITW is greater than or equal to IFIRINIH, the initial value IFIRINI is set to the upper limit initial value IFIRINIH (step S28).

In step S29, a subtraction correction value IFIRDEC, updated in step S63 and used in step S65 both shown in FIG. 7, is set to "0". Thereafter, it is determined whether or not the transient control flag FFIRQUIT is "1" (step S31). If FFIRQUIT is "1", which indicates that the transient control is being performed, the program proceeds directly to step S35. If FFIRQUIT is "0", which indicates that the transient control is not being performed, it is determined whether or not the FIRE mode flag FFIREON was "1" at the preceding cycle (at the preceding execution of this processing) (step S32). If the preceding FFIREON was "1", which indicates a condition immediately after the end of the FIRE mode, the transient control flag FFIRQUIT is set to "1" (step S33), and the program proceeds to step S35.

If the preceding FFIREON was 0 in step S32, a FIRE mode on-counter CFIRON is set to "0" (step S34), and the transient control flag FFIRQUIT is set to "0" (step S39). CFIRON is a counter that is incremented in step S50 shown in FIG. 5 to count the number of repetitions of the FIRE mode. Then, the program is ended.

In step S35, it is determined whether or not the retard correction term IGFPI of the ignition timing IGLOG is greater than a threshold IGFPIQH (e.g., −3 deg) for determination of ending of the transient control. If IGFPI is greater than IGFPIQH, which indicates that the absolute value of the retard correction term IGFPI is small (the retard amount is small), the program proceeds to step S39, so as to end the transient control.

Figure 4:
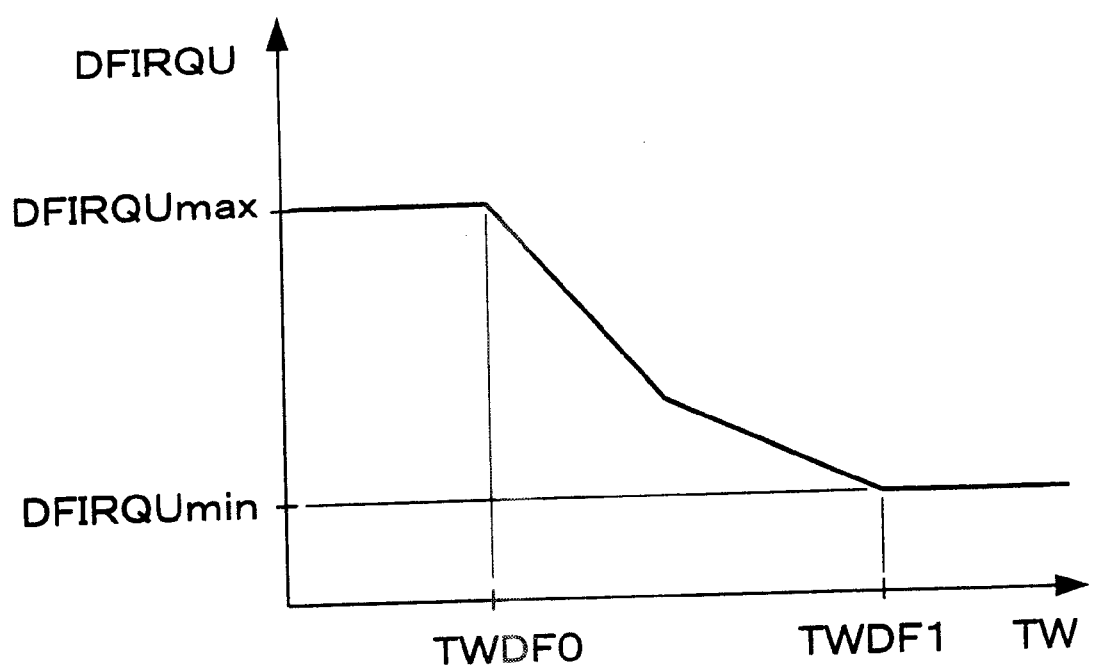
FIG. 4 is a graph showing a table used in the processing shown in FIG. 3.

If IGFPI is less than or equal to IGFPIQH in step S35, a DFIRQU table shown in FIG. 4 is retrieved according to the engine coolant temperature TW to calculate a transient control subtraction value DFIRQU (step S36). The DFIRQU table is set so that the transient control subtraction value DFIRQU decreases with an increase in the engine coolant temperature TW. In FIG. 4, DFIRQUmax and DFIRQUmin are set to a value corresponding to an intake air amount of 5 liters/min and a value corresponding to an intake air amount of 2 liters/min, respectively, for example, and TWDF0 and TWDF1 are set to 28 degrees Centigrade and 62 degrees Centigrade, respectively, for example.

In step S37, the FIRE mode control term IFIR is decremented by the transient control subtraction value DFIRQU. Thereafter, it is determined whether or not the FIRE mode control term IFIR is less than or equal to the lower limit obtained by subtracting the predetermined value DIFIRL from the engine coolant temperature control term ITW (step S38). If IFIR is greater than ITW minus DIFIRL, the program is ended. When IFIR is less than or equal to ITW minus DIFIRL, step S39 is executed and the program is then ended.

As mentioned above, the processing shown in FIG. 3 executes the steps of setting the initial value IFIRINI of the FIRE mode control term IFIR (steps S26 to S28), the steps of the transient control immediately after the end of the FIRE mode (steps S31 to S38), and the steps of initialization of the parameters used in the control to be hereinafter described (steps S29 and S34). By executing the transient control, the intake air amount increased in the FIRE mode is gradually returned to a value in the normal control.

Figure 6A:
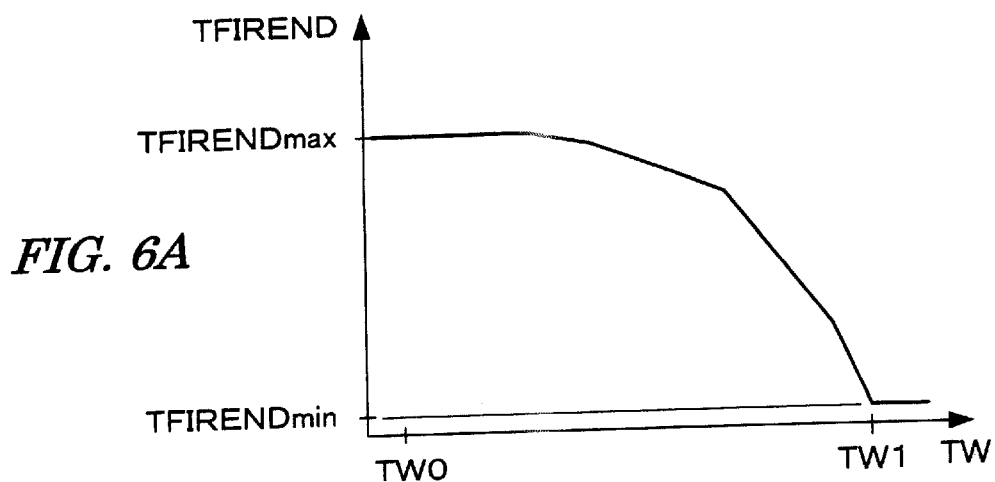
FIGS. 6A to 6C are graphs showing tables used in the processing shown in FIG. 5.

FIG. 5 is a flowchart showing the FIRE mode determination processing executed in step S11 shown in FIG. 2. In step S41, it is determined whether or not a specified failure has already been detected. If the specified failure has not been detected, it is determined whether or not the engine 1 is at starting (at cranking) (step S42). If the answer to either step S41 or S42 is affirmative (YES), a TFIREND table shown in FIG. 6A is retrieved according to the engine coolant temperature TW to determine a FIRE mode end time TFIREND referred in step S46 to be hereinafter described (step S43). The TFIREND table is set so that the FIRE mode end time TFIREND decreases with an increase in the engine coolant temperature TW. In FIG. 6A, TFIRENDmax and TFIRENDmin are set to 50 seconds and 2 seconds, respectively, for example, and TW0 and TW1 are set to −10 degrees Centigrade and 75 degrees Centigrade, respectively, for example.

In step S44, an end flag FFIREND is set to "0", a value of "1" indicates the ending of the FIRE mode. Thereafter, the FIRE mode flag FFIREON is set to "0" (step S56), and the program is ended.

If the answers to steps S41 and S42 are both negative (NO), it is determined whether or not the end flag FFIREND is "1" (step S45). If FFIREND is "1", the program proceeds directly to step S56. When FFIREND is "0", the value of an upcount timer TM20TCR is compared to the FIRE mode end time TFIREND calculated in step S43 (step S46). Upcount timer TM20TCR is started when engine 1 is started (when cranking is finished) and measures the elapsed time since engine 1 started. When TM20TCR is greater than TFIREND, the end flag FFIREND is set to "1", so as to end the FIRE mode (step S48), and the program proceeds to step S56.

Figure 6B:
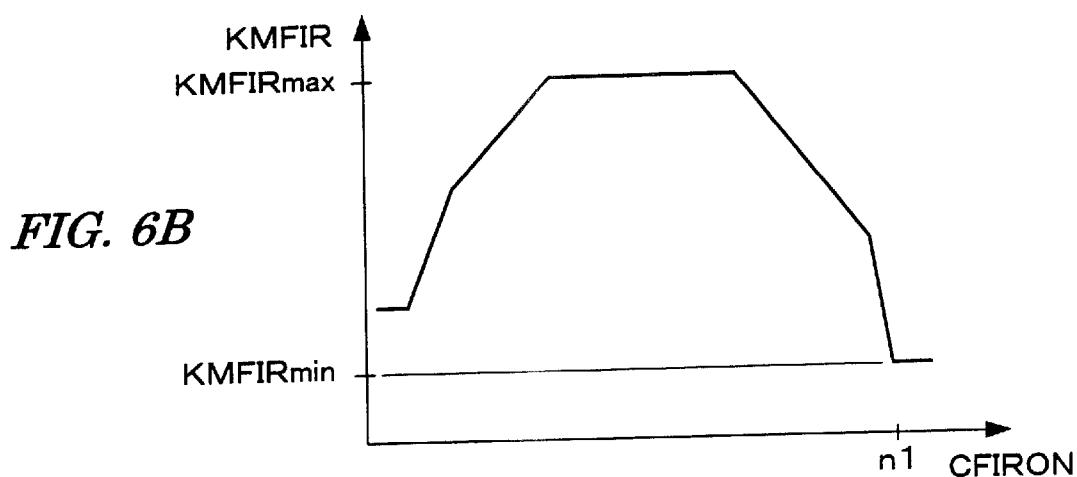

If TM20TCR is less than or equal to TFIREND in step S46, the end flag FEIREND is sent to "0" (step S47), and it is determined whether or not the engine rotational speed NE is greater than or equal to a predetermined lower limit rotational speed NEFIRL (e.g., 700 rpm) (step S49). If NE is less than NEFIRL, the program proceeds to step S56. When NE is greater than or equal to NEFIRL, the FIRE mode on counter CFIRON is incremented by "1" (step S50). Then a KMFIR table shown in FIG. 6B is retrieved according to the value of the counter CFIRON to calculate a continuation time correction coefficient KMFIR used in the processing shown in FIG. 5 (step S51). The KMFIR table is set so that the correction coefficient KMFIR initially increases with an increase in the value of the counter CFIRON and after KMFIR reaching a maximum value, KMFIR may decrease with a further increase in the value of the counter CFIRON. In FIG. 6B, KMFIRmax and KMFIRmin are set to 2.625 and 1.0, respectively, for example, and n1 is set to 2000, for example.

Figure 6C:
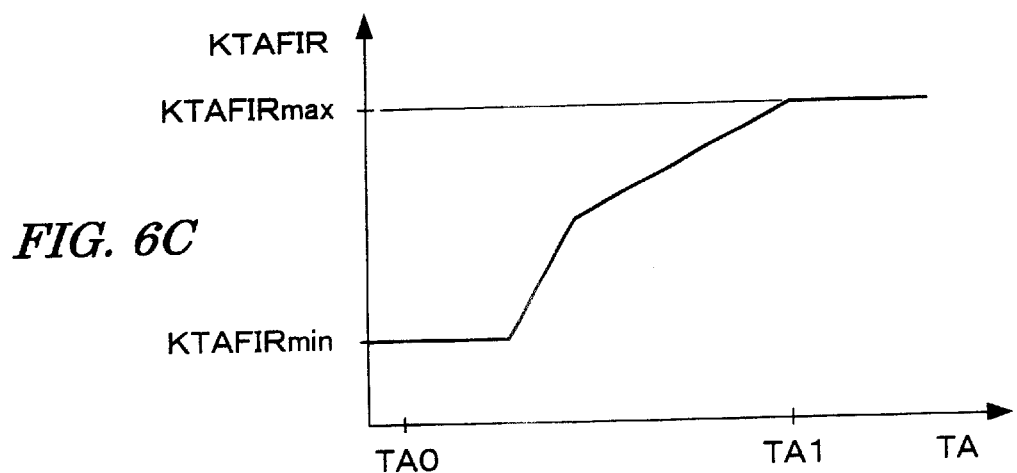

In step S52, a KTAFIR table shown in FIG. 6C is retrieved according to the intake air temperature TA to calculate an intake air temperature correction coefficient KTAFIR used in the processing shown in FIG. 7. The KTAFIR table is set so that the correction coefficient KTAFIR increases with an increase in the intake air temperature TA. In FIG. 6C, KTAFIRmax and KTAFIRmin are set to 2.0 and 1.0, respectively, for example, and TA0 and TA1 are set to −10 degrees Centigrade and 80 degrees Centigrade, respectively, for example.

In step S53, it is determined whether or not the vehicle speed VP is greater than or equal to a predetermined vehicle speed VFIRH (e.g., 5 km/h). If VP is less than VFIRH, it is determined whether or not an idle flag FIDLE is "1", this flag set to "1" indicates that engine 1 is idling (step S54). If VP is greater than or equal to VFIRH, which indicates that the vehicle is running, or if FIDLE is "0", which indicates that the engine 1 is not in the idling condition, the program proceeds to step S56, in which the FIRE mode flag FFIREON is set to "0". On the other hand, if VP is less than VFIRH and the engine 1 is in the idling condition, the FIRE mode flag FFIREON is set to "1"(step S55), and the program is then ended.

FIG. 7 is a flowchart showing the IFIR calculation subroutine of step S14 shown in FIG. 2. In step S61, it is determined whether or not the occurrence of misfire has been detected. The occurrence of misfire is detected by a known method according to fluctuations in period of generation of the CRK signal pulse which is generated at every crank angle of 30 deg. When the occurrence of misfire has not been detected, it is determined whether or not the ignition timing IGLOG is greater than or equal to a value obtained by adding a sticking determination value IGFIRDEC (e.g., 1 deg) and a lower limit IGLGG (e.g., −20 deg) (step S62). When the occurrence of misfire has not been detected and IGLOG is greater than or equal to the sum of IGLGG and IGFIRDEC, the program proceeds to step S64. If the occurrence of misfire has been detected or IGLOG is less than the sum of IGLGG and IGFIRDEC, which indicates that the ignition timing IGLOG sticks to a value in the vicinity of the lower limit IGLGG, a subtraction correction value IFIRDEC (<0) used in step S65 is decremented by a predetermined amount DIFIRDEC (step S63), and the program next proceeds to step S64.

In step S64, a basic value IFIRBS of the FIRE mode control term IFIR is calculated in accordance with Eq. (4).

$$IFIRBS = IFIRINI \times [1 + (KMFIR - 1) \times KTAFIR] \quad (4)$$

KMFIR and KTAFIR are the continuation time correction coefficient and the intake air temperature correction coefficient calculated in steps S51 and S52 shown in FIG. 5, respectively. The continuation time correction coefficient KMFIR changes with time elapsed from the start of the FIRE mode (an increase in the value of the counter CFIRON) as shown in FIG. 6B, so that the intake air amount is basically controlled so as to gradually increase from the start of the FIRE mode, subsequently gradually decrease, and subsequently maintain a substantially constant value (see FIG. 15A).

IFIRINI is the initial value set in step S27 or S28 shown in FIG. 3.

In step S65, the subtraction correction value IFIRDEC updated in step S63 is added to the basic value IFIRBS calculated in step S64 to calculate the FIRE mode control term IFIR. By adding the subtraction correction value IFIRDEC (<0), the intake air amount decreases when a misfire is detected or when the ignition timing IGLOG sticks to a value in the vicinity of the lower limit. Thereby avoiding the possibility that the discharge of unburned fuel may increase or that the retard correction of the ignition timing IGLOG may become impossible (the engine rotational speed NE cannot be made equal to the target rotational speed NEFIR).

Figure 8:
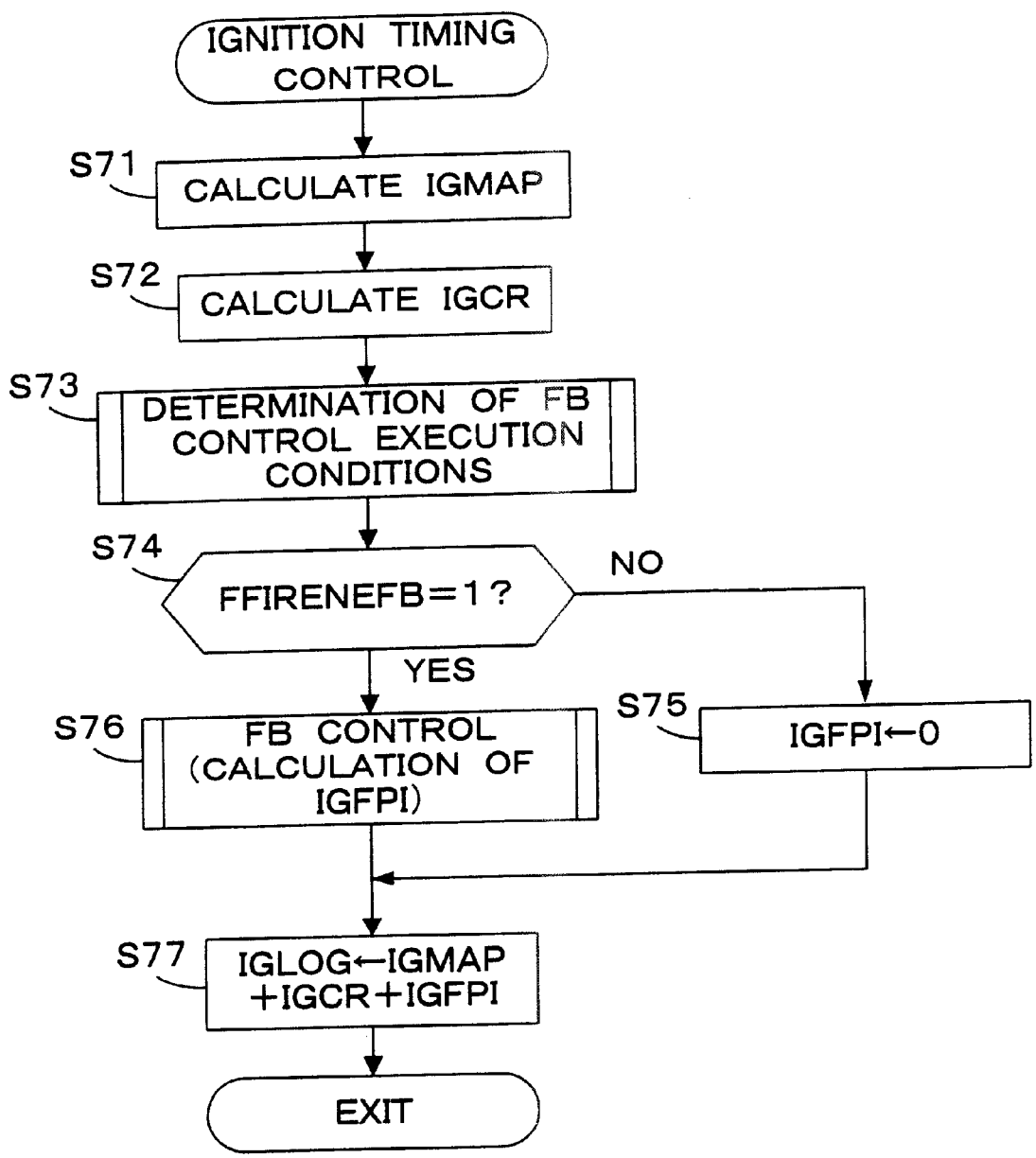
FIG. 8 is a flowchart showing a main routine for execution of ignition timing control.

FIG. 8 is a flowchart showing ignition timing control processing, and this processing is executed in synchronism with the generation of a TDC signal pulse in the CPU 5b.

Figure 9:
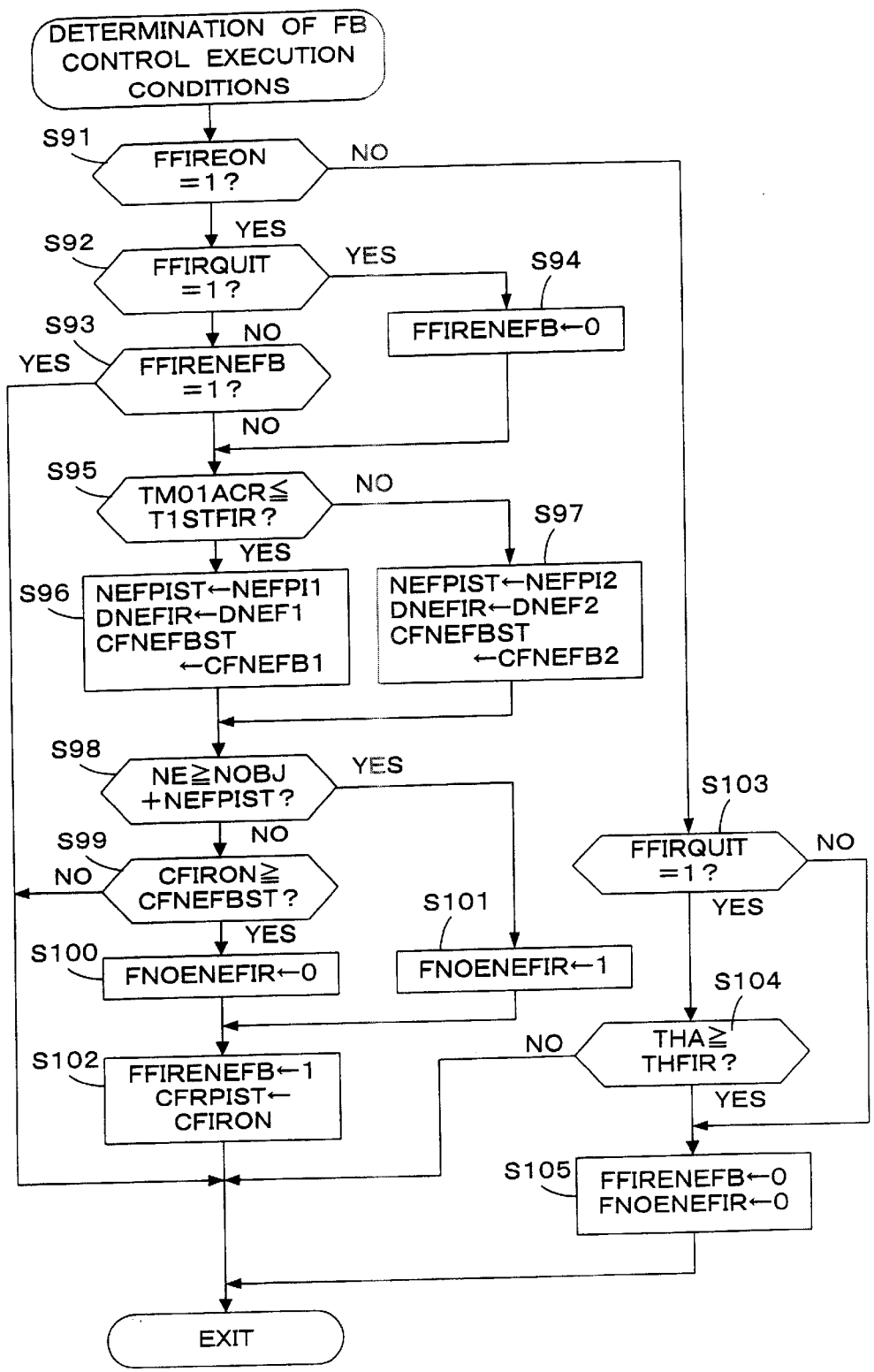
FIG. 9 is a flowchart showing a program for determining execution conditions of feedback control for ignition timing.

In step S71, a basic ignition timing IGMAP is calculated according to the engine rotational speed NE and the absolute intake pressure PBA. Thereafter, a correction term IGCR other than the retard correction term IGFPI is calculated (step S72). In step S73, a processing of determination of feedback (FB) control execution conditions, which is shown in FIG. 9, is executed. This processing is performed to determine execution conditions of feedback control for controlling the ignition timing so that the detected engine rotational speed NE coincides with the target rotational speed NEFIR for the FIRE mode. If the execution conditions are satisfied, a feedback control flag FFIRENEFB is set to "1".

In step S74, it is determined whether or not the feedback control flag FFIRENEFB is "1". If FFIRENEFB is "0", the retard correction term IGFPI is set to "0" (step S75). When FFIRENEFB is "1", which indicates that the execution conditions are satisfied, the feedback control is executed to set the retard correction term IGFPI according to the engine rotational speed NE (step S76).

In step S77, the ignition timing IGLOG is calculated in accordance with Eq. (2) mentioned above. Then, the program is ended.

FIG. 9 is a flowchart showing the processing for determination of the FB control execution conditions executed in step S73 shown in FIG. 8. In step S91, it is determined whether or not the FIRE mode flag FFIREON is "1". If FFIREON is "0", which indicates that the FIRE mode is off, it is determined whether or not the transient control flag FFIRQUIT is "1" (step S103). When FFIRQUIT is "0", which indicates that the transient control is off, both the feedback control flag FFIRENEFB and a target rotational speed flag FNOENEFIR are set to "0" (Step 105). If the target rotational speed flag FNOENEFIR's "1", this indicates that there was no increase in the target rotational speed during the feedback control (see step S131 in FIG. 12). Then, the program is ended.

If FFIRQUIT is "1" in step S103, which indicates that the transient control is on, it is determined whether or not the throttle valve opening THA is greater than or equal to a predetermined valve opening THFIR (e.g., 0.88 deg) (step S104). If THA less that THFIR, which indicates that the throttle valve is in a substantially fully closed condition, the program is ended. When THA is greater than or equal to THFIR, the program proceeds to step S105. In the case that the program is ended directly from step S104, FFIRENEFB of "1" is maintained even if FFIREON is "0", thus continuing the feedback control.

If FEIREON is "1" in step S91, it is determined whether or not the transient control flag FFIRQUIT is "1" (step S92). If FFIRQUIT is "1", the feedback control flag FFIRENEFB is set to "0" (step S94), and the program proceeds to step S95. If FFIRQUIT is "0", it is determined whether or not the feedback control flag FFIRENEFB has already been set to "1" (step S93). If FFIRENEFB is "1", the program is ended.

In step S95, it is determined whether or not the value of an upcount timer TM01ACR is less than or equal to a predetermined time T1STFIR (e.g., 1 msec). If TM01ACR is less than or equal to T1STFIR, which indicates that the engine 1 has just started, an addition value NEFPIST for feedback control start determination, an addition value DNEFIR for target rotational speed correction, and a count value CFNEFBST for feedback control start determination are set to first values NEFPI1 (e.g., 200 rpm), DNEF1 (e.g., 1 rpm), and CFNEFB1 (e.g., 200), respectively (step S96). When TM01ACR is greater than T1STFIR, the addition value NEFPIST, the addition value DNEFIR, and the count value CFNEFBST are set to second values NEFPI2 (e.g., 200 rpm), DNEF2 (e.g., 12 rpm), and CFNEFB2 (e.g., 2), respectively (step S97).

In step S98, it is determined whether or not the engine rotational speed NE is higher than or equal to a value obtained by adding the addition value NEFPIST for feedback control start determination and a target rotational speed NOBJ for the normal control. If NE is less than the sum of NOBJ and NEFPIST, it is determined whether or not the value of the FIRE mode on-counter CFIRON is greater than or equal to the count value CFNEFBST for feedback control start determination (step S99). When the answers to steps S98 and S99 are both negative (NO), which indicates that the engine rotational speed NE is low and the FIRE mode continuation time is short, the feedback control is not executed and the program is accordingly ended.

If NE is greater than or equal to the sum of NOBJ and NEFPIST in step S98, the target rotational speed flag FNOENEFIR is set to "1" (step S101). When CFIRON is greater than or equal to CFNEFBST in step S99, the target rotational speed flag FNOENEFIR is set to "0" (step S100). After executing step S101 or S100, the program proceeds to step S102. Accordingly, if the engine rotational speed NE at starting the feedback control is high (NE is greater than or equal to (NOBJ+NEFPIST)), a target rotational speed addition value ENEFIR used for calculation of the target rotational speed NEFIR for the FIRE mode is set to "0" (see FIG. 12 and steps S117 and S118 in FIG. 10).

In step S102, the feedback control flag FFIRENEFB is set to "1", and the value of the FIRE mode on-counter CFIRON is stored as a stored value CFRPIST.

Figure 10:
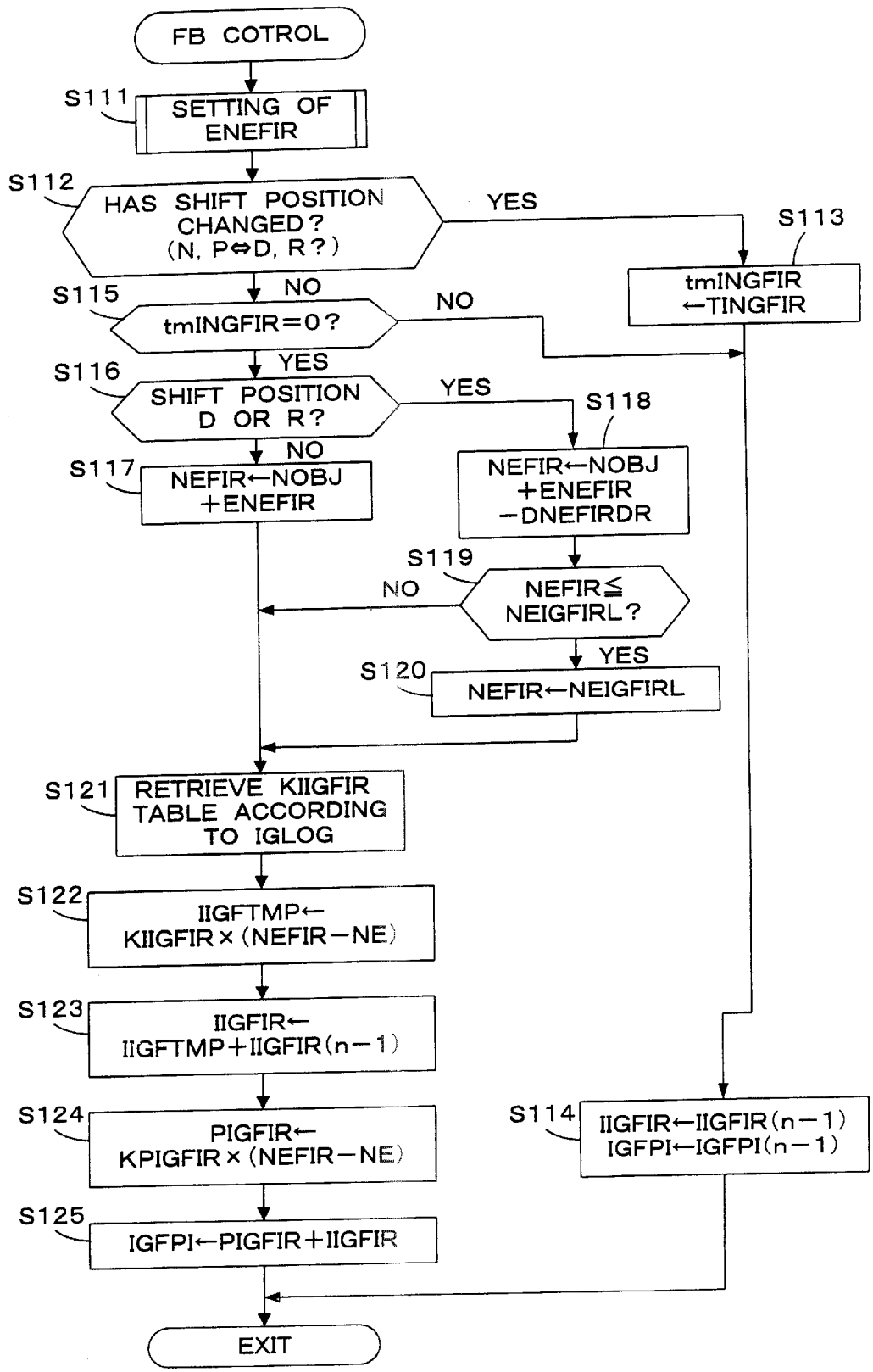
FIG. 10 is a flowchart showing a program for executing the feedback control for the ignition timing.

FIG. 10 is a flowchart showing the feedback control processing executed in step S76 shown in FIG. 8. In step S111, the processing of setting the target rotational speed addition value ENEFIR (FIG. 12) is executed to set the addition value ENEFIR.

In step S112, it is determined whether or not the shift position SFT of the automatic transmission has been changed from a neutral position N or a parking position P to a drive position D or a reverse position R (in-gear condition) or vice versa. If the shift position has been changed, a predetermined time TINGFIR (e.g., 3 seconds) is set to a downcount timer tmINGFIR referred in step S115, and the downcount timer tmINGFIR is started (step S113). Thereafter, the preceding values of both an integral term IIGFIR(n−1) and a retard correction term IGFPI(n−1) in the feedback control are held as present values IIGFIR and IGFPI (step S114) and the program is ended.

If the shift position has not been changed in step S112, it is determined whether or not the value of the timer tmINGFIR started in step S113 is "0" (step S115). If tmINGFIR is greater than 0, the program proceeds to step S114. If tmINGFIR is equal to 0, it is determined whether or not the shift position SFT is the drive position D or the reverse position R (in-gear condition) (step S116). When the shift position SFT is not in the in-gear condition, the target rotational speed NEFIR is calculated in accordance with Eq. (5) (step S117), and the program proceeds to step S121.

$$NEFIR=NOBJ+ENEFIR \quad (5)$$

NOBJ is the target rotational speed at idling in a normal mode (other than the FIRE mode).

ENEFIR is the target rotational speed addition value calculated in step S111.

If the shift position SFT is the drive position D or the reverse position R, i.e., the shift position SFT is in the in-gear condition in step S116, the target rotational speed NEFIR is calculated in accordance with Eq. (6) (step S118).

$$NEFIR=NOBJ+NEFIR-DNEFIRDR \quad (6)$$

DNEFIRDR is an in-gear condition correction value set to 300 rpm, for example.

In step S119, it is determined whether or not the target rotational speed NEFIR for the FIRE mode is less than or equal to a lower limit NEIGFIRL (e.g., 730 rpm). If NEFIR is greater than NEIGFIRL, the program proceeds directly to step S121. When NEFIR is less than or equal to NEIGFIRL, the target rotational speed NEFIR is set to the lower limit NEIGFIRL (step S120), and the program next proceeds to step S121.

Figure 11:
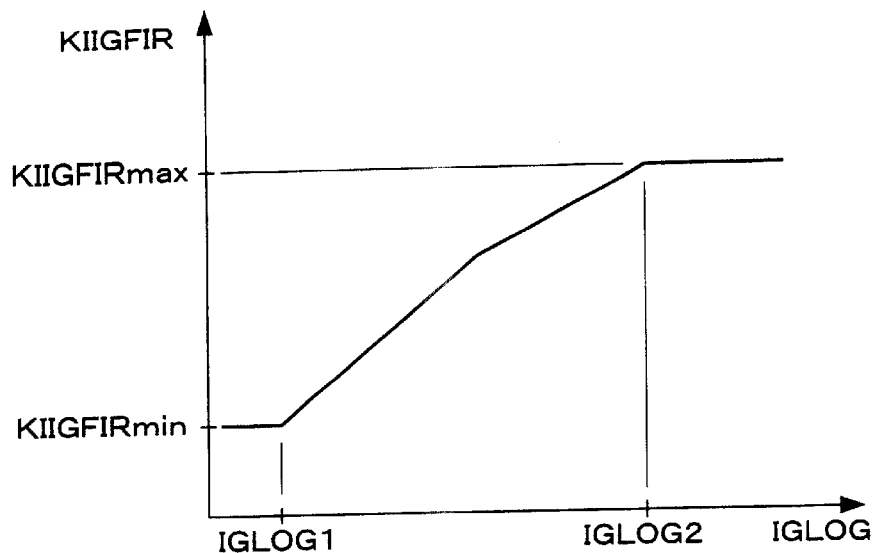
FIG. 11 is a graph showing a table used in the processing shown in FIG. 10.

In step S121, a KIIGFIR table shown in FIG. 11 is retrieved according to the ignition timing IGLOG to calculate an integral term gain KIIGFIR. The KIIGFIR table is set so that the integral term gain KIIGFIR increases with an increase (advance) in the ignition timing IGLOG. In FIG. 11, KIIGFIRmax and KIIGFIRmin are set to 0.063 and 0.016, respectively, for example, and IGLOG1 and IGLOG2 are set to −10 deg and 12 deg, respectively, for example.

In step S122, the engine rotational speed NE, the target rotational speed NEFIR for the FIRE mode, and the integral term gain KIIGFIR are applied to Eq. (7) to calculate an addition value IIGFTMP.

$$IIGFTMP=KIIGFIR\times(NEFIR-NE) \quad (7)$$

In step S123, the addition value IIGFTMP is added to the preceding value IIGFIR(n−1) of the integral term to calculate the integral term (present value) IIGFIR. Thereafter, a proportional term PIGFIR is calculated in accordance with Eq. (8) (step S124).

$$PIGFIR=KPIGFIR\times(NEFIR-NE) \quad (8)$$

Thereafter, the integral term IIGFIR and the proportional term PIGFIR are added to calculate a retard correction term IGFPI (step S125), and the program is ended.

By the processing of FIG. 10, the feedback control is executed to calculate the retard correction term IGFIR so that the engine rotational speed NE coincides with the target rotational speed NEFIR for the FIRE mode.

Figure 12:
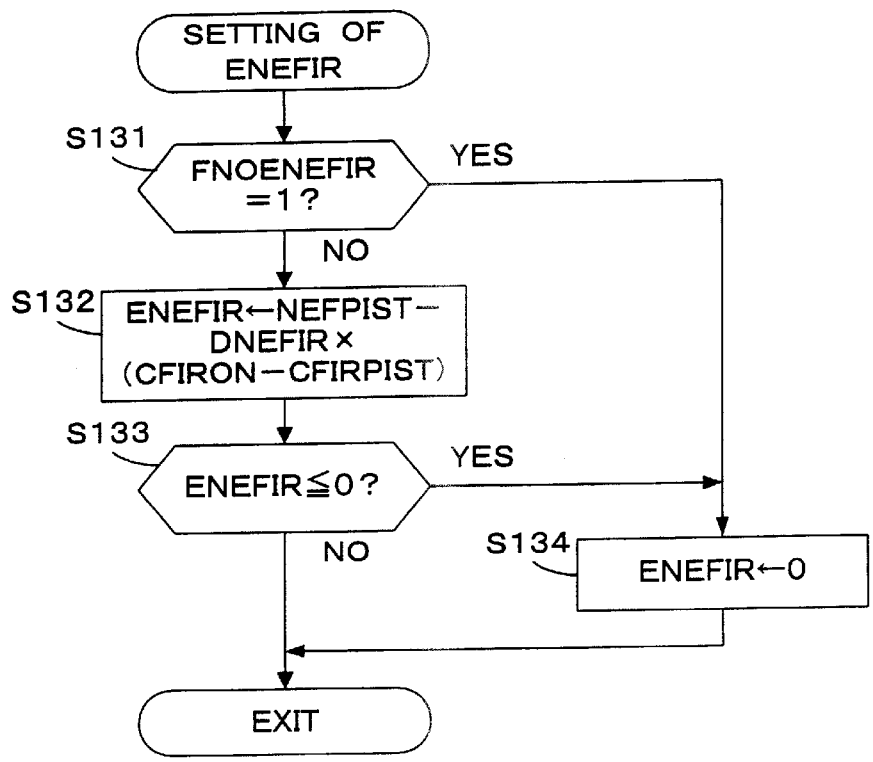
FIG. 12 is a flowchart showing a program for setting an addition value (ENEFIR) for a target engine rotational speed in the catalyst temperature rise acceleration control.

FIG. 12 is a flowchart showing the processing of setting ENEFIR executed in step S111 shown in FIG. 10. In step S131, it is determined whether or not the target rotational speed flag FNOENEFIR is "1". If FNOENEFIR is "1", which indicates that the target rotational speed is not to be increased, the target rotational speed addition value ENEFIR is set to "0" (step S134), and the program is ended.

If FNOENEFIR is "0", the addition value ENEFIR is calculated in accordance with Eq. (9) (step S132).

$$ENEFIR=NEFPIST-DNEFIR\times(CFIRON-CFIRPIST) \quad (9)$$

NEFPIST and DNEFIR are the addition value for feedback control start determination and the addition value for target rotational speed correction set in step S96 or S97, respectively and shown in FIG. 9.

CFIRON is the value of the FIRE mode on-counter.

CFIRPIST is the value stored in step S102 shown in FIG. 9.

The difference between CFIRON and CFIRPIST is a count value corresponding to the elapsed time after starting of the feedback control. Accordingly, the target rotational speed NEFIR for the FIRE mode is set so that it becomes equal to the sum of NOBJ and NEFPIST at the start of the feedback control and that it gradually decreases with elapsed time until finally reaching the target rotational speed NOBJ for the normal control according to Eq. (9) and Eq. (5) or (6) (see FIG. 15C).

In step S133, it is determined whether or not the addition value ENEFIR is less than or equal to 0. If ENEFIR is less than or equal to 0, the program proceeds to step S134. When ENEFIR is greater than 0, the program is ended.

Figures 15A, 15B, 15C:
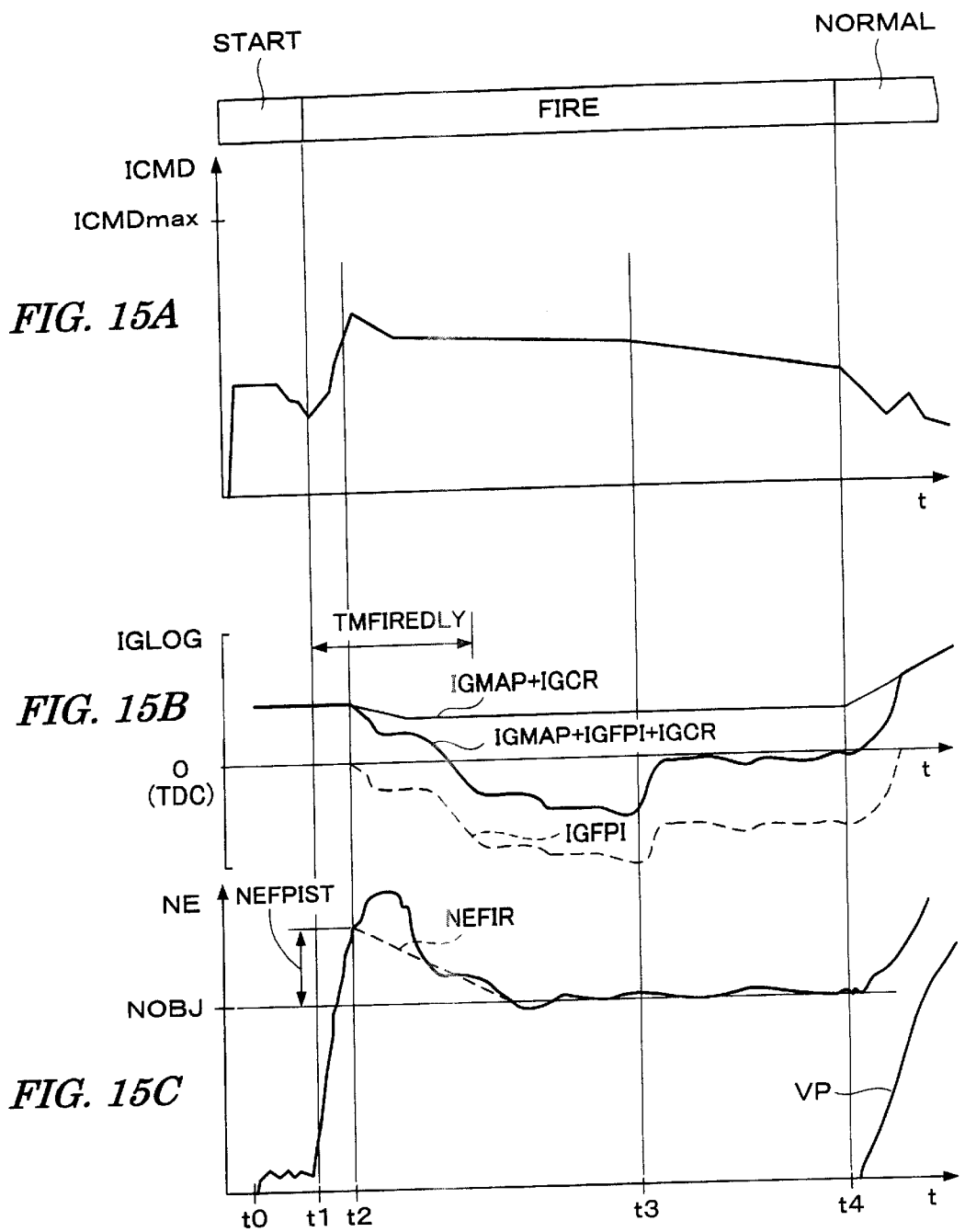
FIGS. 15A to 15C are time charts for illustrating the operation in executing the catalyst temperature rise acceleration control according to the first preferred embodiment.

FIGS. 15A, 15B, and 15C are time charts for illustrating the intake air amount control and the ignition timing control mentioned above. FIG. 15A shows changes in the valve opening control amount ICMD of the auxiliary air control valve 18. FIG. 15B shows changes in the ignition timing IGLOG. FIG. 15C shows changes in the engine rotational speed NE.

In the example shown in FIGS. 15A to 15C, the engine 1 is started at the time t0 (i.e., cranking is started at the time t0), and the engine 1 starts running (self sustaining operation) at the time t1. At time t1, the FIRE mode is started. After starting the FIRE mode, the engine rotational speed NE is increased, and the execution conditions of the feedback control for ignition timing are satisfied at the time t2. Consequently, feedback control is started. As mentioned above, the target rotational speed NEFIR for the FIRE mode is equal to the sum of NOBJ and NEFPIST at the beginning of the FIRE mode, and is thereafter gradually decreased to the target rotational speed NOBJ for normal control.

The valve opening control amount ICMD is controlled so that it is gradually increased after starting the FIRE mode and then decreased. Immediately after the FIRE mode is ended at the time t4, the transient control is performed to gradually decrease the valve opening control amount ICMD.

The retard correction term IGFPI changes as shown by a broken line in FIG. 15B, and the ignition timing IGLOG is controlled to be retarded from the normal control value (IGMAP+IGCR). When the shift position SFT is changed from the neutral position N to the in gear condition at the time t3, the engine load increases and the retard correction term IGFPI is therefore increased (the retard amount is decreased) to increase the output torque of the engine 1. At the same time, the engine rotational speed NE is maintained at the target rotational speed NEFIR which equals NOBJ. After the time t4, the ignition timing IGLOG is controlled to gradually approach the normal control value.

During the time period between t2 and t4, the engine rotational speed NE is controlled so as to coincide with the target rotational speed NEFIR by the feedback control. In the example shown in FIGS. 15A to 15C, the vehicle is started immediately after the time t4, and the vehicle speed VP is gradually increased.

Figure 13:
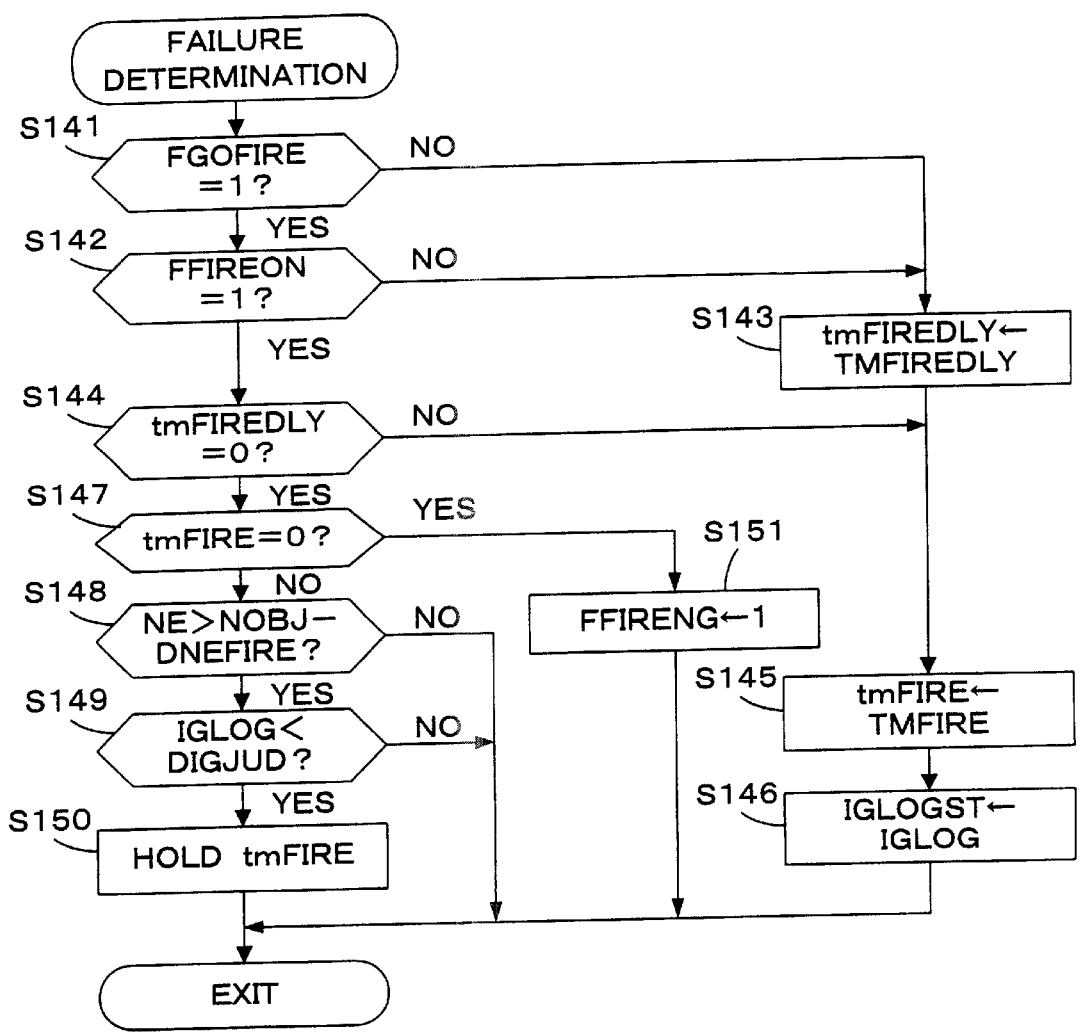
FIG. 13 is a flowchart showing a program for executing failure determination according to the first preferred embodiment.

FIG. 13 is a flowchart showing failure determination processing for determining a failure to properly execute the operation of the FIRE mode. This processing is executed by the CPU 5b at predetermined time intervals or in synchronism with the generation of a TDC signal pulse.

In step S141, it is determined whether or not a failure determination enabling flag FGOFIRE is "1", indicating the satisfaction of execution conditions of failure determination. If FGOFIRE is "0", which indicates that the execution conditions are not satisfied, a predetermined delay time TMFIREDLY (e.g., 2 seconds) is set in a delay downcount timer tmFIREDLY and this timer is started (step S143). Further, a predetermined determination time TMFIRE (e.g., 15 seconds) is set in a downcount timer tmFIRE for failure determination and this timer is started (step S145). Further, the ignition timing IGLOG is stored as a stored value IGLOGST (step S146), and the program is ended. The predetermined delay time TMFIREDLY is set so that step S147 and the following steps are executed after the time the ignition timing IGLOG is shifted to the retard side (negative value) by the feedback control of the ignition timing (see FIG. 15B).

If FGOFIRE is "1" in step S141, it is determined whether or not the FIRE mode flag FFIREON is "1" (step S142). If FFIREON is "0", which indicates that the FIRE mode is off, the program proceeds to step S143. If FFIREON is "1", it is determined whether or not the value of the timer tmFIREDLY started in step S143 is "0" (step S144). If tmFIREDLY is greater than 0, the program proceeds to step S145.

If tmFIREDLY is 0, it is determined whether or not the value of the failure determination timer tmFIRE is 0 (step S147). At first, tmFIRE is greater than 0, so that it is then determined whether or not the engine rotational speed NE is greater than a value obtained by subtracting a predetermined difference DNEFIRE (e.g., 200 rpm) from the target rotational speed NOBJ (step S148). If NE is greater than the difference between NOBJ and DNEFIRE, than it is determined whether or not the ignition timing IGLOG is less than a determination threshold DIGJUD (whether or not the ignition timing IGLOG is on the retard side with respect to the determination threshold DIGJUD) (step S149). If the answers to steps S148 and S149 are both affirmative (YES), which indicates that the engine rotational speed NE and the ignition timing IGLOG fall in the respective normal ranges, the failure determination timer tmFIRE is held to stop downcounting (step S150).

Accordingly, if the FIRE mode is ended with the timer tmFIRE being held, no failure is determined and the program proceeds from step S142 to step S143. Conversely, if the answer to step S148 or S149 is negative (NO), the failure determination timer tmFIRE continues to downcount, and if tmFIRE is "0", a failure is detected. Then, the program proceeds from step S147 to step S151, in which a failure flag FFIRENG is set to "1", indicating the occurrence of the failure that the operation of the FIRE mode was not properly performed (step S151), and the program is ended.

Figure 14:
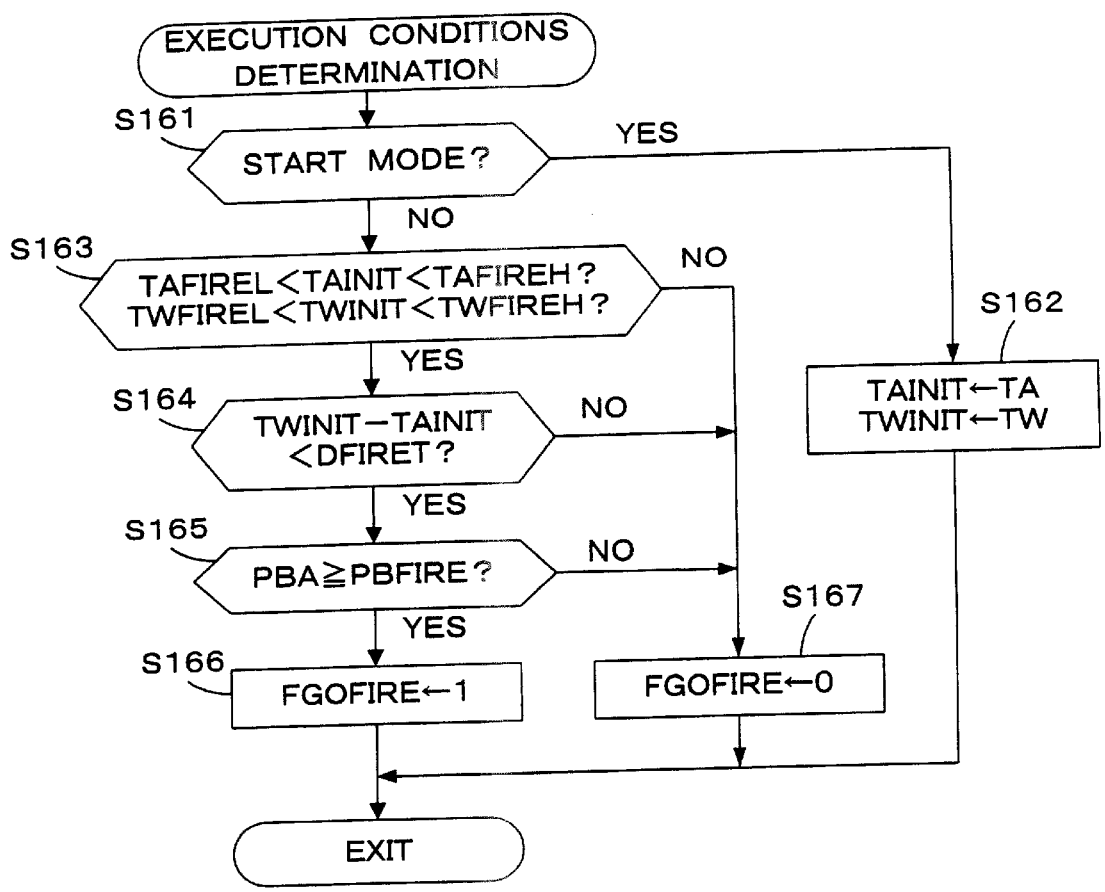
FIG. 14 is a flowchart showing a program for determining execution conditions of the failure determination.

FIG. 14 is a flowchart showing the process utilized for determining the execution conditions for failure determination. This processing is executed by the CPU 5b at predetermined time intervals or in synchronism with the generation of a TDC signal pulse.

In step S161, it is determined whether or not the engine 1 is in the start mode, i.e., cranking. If the engine 1 is cranking, the intake air temperature TA and the engine coolant temperature TW are stored as an initial intake air temperature TAINIT and an initial coolant temperature TWINIT, respectively (step S162), and the program is ended.

If the start mode has been completed, it is determined whether or not the initial intake air temperature TAINIT is between a predetermined upper limit TAFIREH (e.g., 4.5 degrees Centigrade) and a predetermined lower limit TAFIREL (e.g., –6.7 degrees Centigrade). It is also determined whether or not the initial coolant temperature TWINIT is between a predetermined upper limit TWFIREH (e.g., 4.5 degrees Centigrade) and a predetermined lower limit TWFIREL (e.g., –6.7 degrees Centigrade) (step S163). If TAINIT falls between TAFIREL and TAFIREH and TWINIT falls between TWFIREL and TAFIREH, it is determined whether or not the difference between the initial coolant temperature TWINIT and the initial intake air temperature TAINIT is less than a predetermined difference DFIRET (e.g., 7 deg) (step S164). When the difference between TWINIT and TAINIT is less than DFIRET, it is determined whether or not the absolute intake pressure PBA is greater than or equal to a predetermined pressure PBFIRE (e.g., 34.7 kPa) (step S165). If the answers to all of steps S163 to S165 are affirmative (YES), it is determined that the execution conditions are satisfied. Consequently, the determination enabling flag FGOFIRE is set to "1" (step S166). However, when the answer to any one of steps S163 to S165 is negative (NO), that is, if the initial intake air temperature TAINIT or the initial coolant temperature TWINIT is not in the range between the respective predetermined upper and lower limits, if the difference between the initial coolant temperature TWINIT and the initial intake air temperature TAINIT is large, or if PBA is less than PBFIRE, which indicates an extremely low-load operational condition, it is determined that the execution conditions are not satisfied, so that the determination enabling flag FGOFIRE is set to "0" (step S167).

In the case that the difference between the initial coolant temperature TWINIT and the initial intake air temperature TAINIT is large, the engine temperature has not been sufficiently lowered and the start condition is not cold start, so that the failure determination is inhibited. In the case of a low-load operational condition satisfying PBA is less than PBFIRE, it is estimated that the friction in the engine is much less than that at normal cold starting, so that the ignition timing set by the feedback control after starting the FIRE mode is largely changed to the retard side and there is a possibility of improper determination that the FIRE mode control is normal in spite of the occurrence of failure. Therefore, also in this case, the failure determination is inhibited.

FIGS. 16A, 16B, 16C, and 16D are time charts respectively showing changes in the valve opening control amount ICMD of the auxiliary air control valve 18, changes in the ignition timing IGLOG, changes in the engine rotational speed NE, and changes in value of the failure determination timer tmFIRE, in the case that the failure has occurred. The valve opening control amount ICMD shown in FIG. 16A changes similarly to that shown in FIG. 15A. If there occurs a failure such that the actual intake air amount is not increased and the engine rotational speed NE gradually decreases, although the valve opening control amount ICMD is controlled as shown in FIG. 16A, the retard correction term IGFPI remains 0 and the ignition timing IGLOG is not corrected to the retard side. Accordingly the failure determination timer tmFIRE is started to downcount from the time t11 at which the predetermined delay time TMFIREDLY has elapsed. Thereafter, it is determined that the FIRE mode control is not properly executed at the time t12 at which the determination time TMFIRE has elapsed, and the failure flag FFIRENG is set to "1".

In this preferred embodiment as mentioned above, it is determined whether or not the FIRE mode control (temperature rise acceleration control of the three-way catalyst 16) is properly executed according to the engine rotational speed NE and the ignition timing IGLOG during the execution of the FIRE mode control. Accordingly, a failure such that the auxiliary air control valve 18 does not perform a valve opening operation according to the valve opening control amount ICMD, for example, can be quickly detected, and any trouble in the catalyst temperature rise acceleration control can be diagnosed early to minimize the deterioration in exhaust emission characteristics.

In this preferred embodiment, the auxiliary air passage 17 and the auxiliary air control valve 18 constitute a part of the intake air amount control means, and the ECU 5 constitutes a part of the intake air amount control means, the ignition timing control means, the catalyst temperature raising means, and the failure diagnosing means. More specifically, the processing illustrated in FIGS. 2, 3, 5, and 7 correspond to the intake air amount control means; the processing illustrated in FIGS. 8, 9, 10, and 12 correspond to the ignition timing control means; the processing illustrated in FIGS. 7 and 10 correspond to the catalyst temperature raising means; and the processing shown in FIGS. 13 and 14 correspond to the failure diagnosing means.

The above preferred embodiment may be modified as follows:

First Modification

Figure 17A:
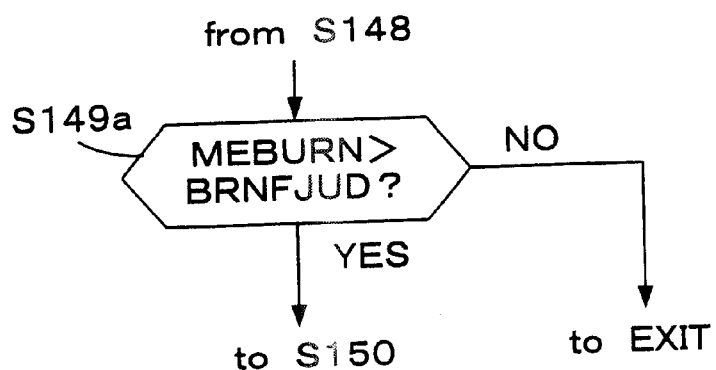
FIGS. 17A and 17B are flowcharts for illustrating modifications of the processing shown in FIG. 13.

Step S149 shown in FIG. 13 may be replaced by step S149a shown in FIG. 17A. In step S149a, it is determined whether or not a time interval MEBURN between a CRK signal pulse generated at the time the piston in a specified cylinder reaches a top dead center (TDC) and a CRK signal pulse generated at the time the piston reaches a crank angle position of 30 degrees ATDC (after top dead center) is greater than a determination threshold BRNFJUD. If MEBURN is greater than BRNFJUD, it is determined that the ignition timing is properly retarded, and the program proceeds to step S150, whereas if MEBURN is less than or equal to BRNFJUD, it is determined that the ignition timing is not properly retarded, and the processing of FIG. 13 is ended.

This determination is intended to check the ignition timing. When the ignition timing is on the advance side with respect to the top dead center, the engine rotational speed during the period from the top dead center to 30 degrees ATDC is increased. If the ignition timing is on the retard side with respect to the top dead center, the timing of increasing the engine rotational speed is shifted toward the retard side. That is, a large time interval MEBURN between the CRK signal pulses indicates that the engine rotational speed during this period is low, so that it is determined that the ignition timing is properly retarded.

The time interval MEBURN may be replaced by a time interval MEBURNA between a CRK signal pulse corresponding to 30 degrees ATDC and a CRK signal pulse corresponding to 60 degrees ATDC. In this case, if the time interval MEBURNA is less than the determination threshold, it is determined that the ignition timing is properly retarded.

In this modification, an actual ignition timing is determined according to a crank angle position where the engine rotational speed becomes maximum. That is, failure of the catalyst temperature rise acceleration control is determined according to a crank angle position where the engine rotational speed becomes maximum.

Second Modification

Figure 17B:
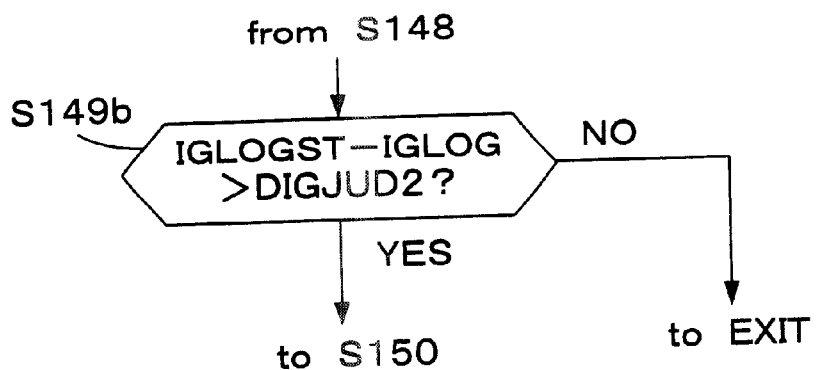

Step S149 shown in FIG. 13 may also be replaced by step S149b shown in FIG. 17B. In step S149b, it is determined whether or not the difference between the stored value IGLOGST stored in step S146 shown in FIG. 13 and the ignition timing IGLOG (present value) is greater than a determination threshold DIGJUD2. When the difference between IGLOGST and IGLOG is greater than DIGJUD2, it is determined that the ignition timing is properly retarded, and the program proceeds to step S150. If this difference is less than or equal to DIGJUD2, it is determined that the ignition timing is not properly retarded, and the processing of FIG. 13 is ended.

In this modification, the failure determination is performed according to the difference between IGLOGST and IGLOG rather than according to the ignition timing IGLOG itself.

Second Preferred Embodiment

In the second preferred embodiment, the intake air amount to the engine 1 is gradually decreased during the execution of the FIRE mode control, and failure diagnosis is performed according to the engine rotational speed NE and/or the ignition timing when decreasing the intake air amount. The second preferred embodiment is similar to the first preferred embodiment except as described with reference to FIGS. 18 to 21C.

Figure 18:
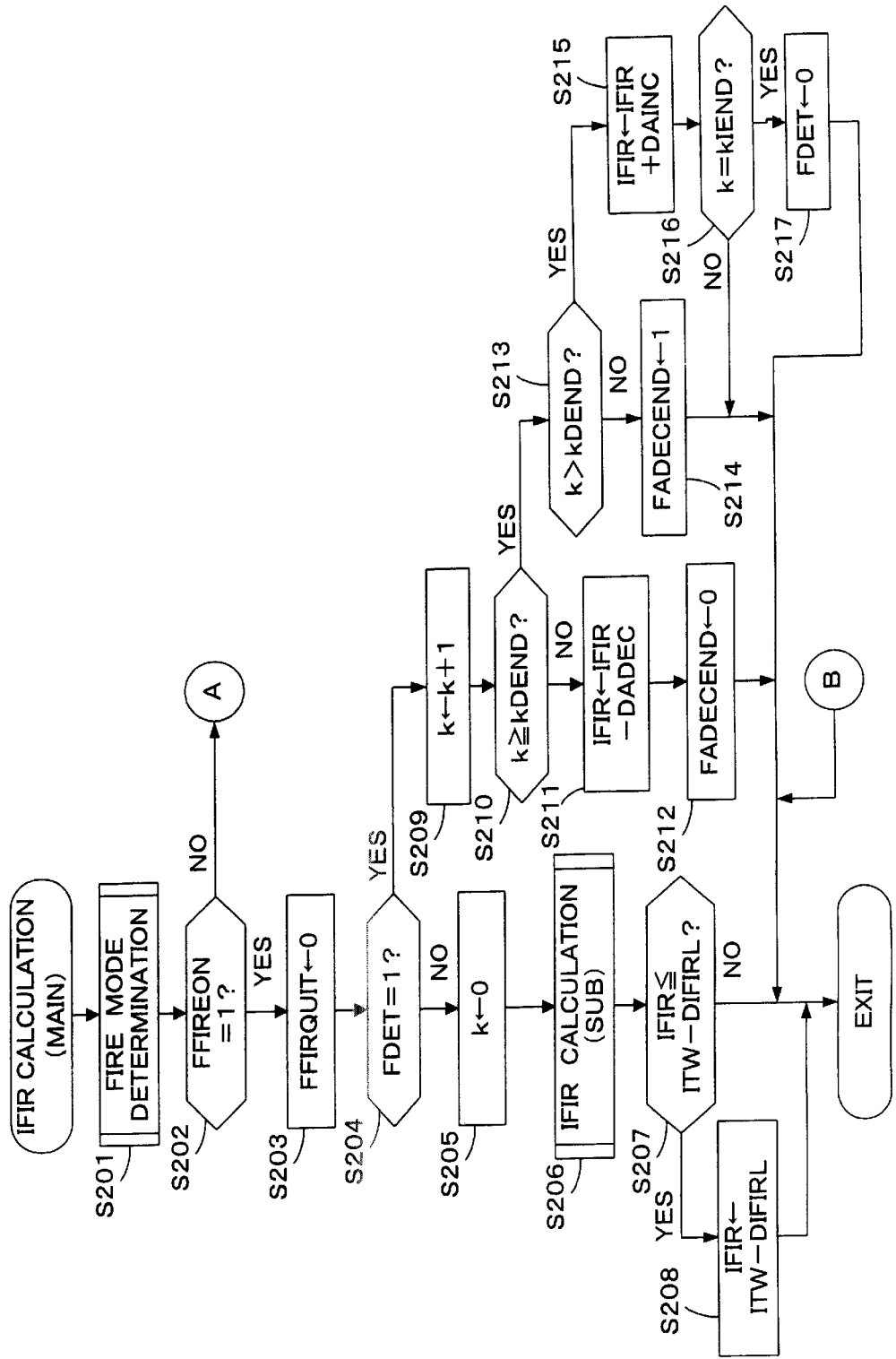
FIG. 18 is a flowchart showing a main routine for calculation of the control amount (IFIR) of the auxiliary air control valve according to a second preferred embodiment of the present invention.

FIG. 18 is a flowchart showing a main routine for calculation of a FIRE mode control term IFIR in the second preferred embodiment. The processing in any mode other than the FIRE mode is the same as that of the first preferred embodiment (FIG. 3).

In step S201, the FIRE mode determination processing shown in FIG. 5 is executed. The FIRE mode determination processing includes the steps of setting the FIRE mode flag FFIREON to "1" or "0". FFIREON to "1" indicates the allowance of transition to the FIRE mode or continuation of the FIRE mode.

In step S202, it is determined whether or not the FIRE mode flag FFIREON is "1". If FFIREON is "0", which indicates that the transition to the FIRE mode or the continuation of the FIRE mode is not allowed, the program proceeds to step S26 (FIG. 3). If FFIREON is "1", which indicates that the transition to the FIRE mode or the continuation of the FIRE mode is allowed, the transient control flag FFIRQUIT is set to "0". FFIRQUIT set to "1" indicates the duration of execution of transient control immediately after the end of the FIRE mode (step S203). Next it is determined whether or not a failure determination execution flag FDET is "1", indicating the execution of failure determination (step S204). This failure determination execution flag FDET is set in the failure determination processing shown in FIG. 19 to be hereinafter described, and is set to "1" at the time when the predetermined delay time TMFIREDLY has elapsed after the start of the FIRE mode.

Immediately after the start of the FIRE mode, FDET is "0" in step S204. Then, a counter k (incremented in step S209) is set to "0" (step S205), and the IFIR calculation subroutine shown in FIG. 7 is executed (step S206). Thereafter, it is determined whether or not the FIRE mode control term IFIR calculated in step S206 is less than or equal to a lower limit obtained by subtracting DIFIRL from ITW. DIFIRL is a predetermined value for lower limit setting (e.g., a value corresponding to an air amount of 100 liters/min). The engine coolant temperature control term ITW is set according to the engine coolant temperature TW (step S207). If IFIR is greater than the difference between ITW and DIFIRL, the program ends. When IFIR is less than or equal to the difference between ITW and DIFIRL, the FIRE mode control term IFIR is set to the lower limit (ITW−DIFIRL) (step S208) and the program ends.

If FDET is "1" in step S204, the program proceeds to step S209 and the following steps to gradually decrease the FIRE mode control term IFIR of the valve opening control amount ICMD to decrease the intake air amount. Then the program gradually increases the FIRE mode control term IFIR to a value which is substantially the same as the value before the gradual decrease. In the failure determination processing shown in FIG. 19 to be hereinafter described, a failure determination step is executed at the time the gradually decreasing process ends.

In step S209, the counter k is incremented by "1". Thereafter, it is determined whether or not the current value of the counter k is greater than or equal to a decrease end determination value kDEND (step S210). If k is less than kDEND, the FIRE mode control term IFIR is decremented by a predetermined decrease value DADEC (step S211), and a decrease end flag FADECEND is set to "0", indicating the continuation of the decrease processing (step S212). Thereafter, the program is ended. If k is greater than or equal to kDEND, the program proceeds from step S210 to step S213, and it is determined whether or not the value of the counter k is greater than the decrease end determination value kDEND. If k equals kDEND, the decrease end flag FADECEND is set to "1" (step S214), and the program is ended. When the flag FADECEND becomes "1", the failure determination step is executed in the processing of FIG. 19.

In the next and subsequent cycles of this routine, the answer to step S213 becomes affirmative (YES), and the program therefore proceeds to step S215. In step S215, the FIRE mode control term IFIR is incremented by a predetermined increase value DAINC. Thereafter, it is determined whether or not the current value of the counter k has reached an increase end determination value kIEND (step S216). If k is less than kIEND, the program is ended at once. When if k equals kIEND, the failure determination execution flag FDET is restored to "0" (step S217) and the program is then ended. When FDET is "0", the program proceeds from step S204 to step S205 in the next and subsequent cycles and repeats this processing until the FIRE mode is ended.

Figure 19:
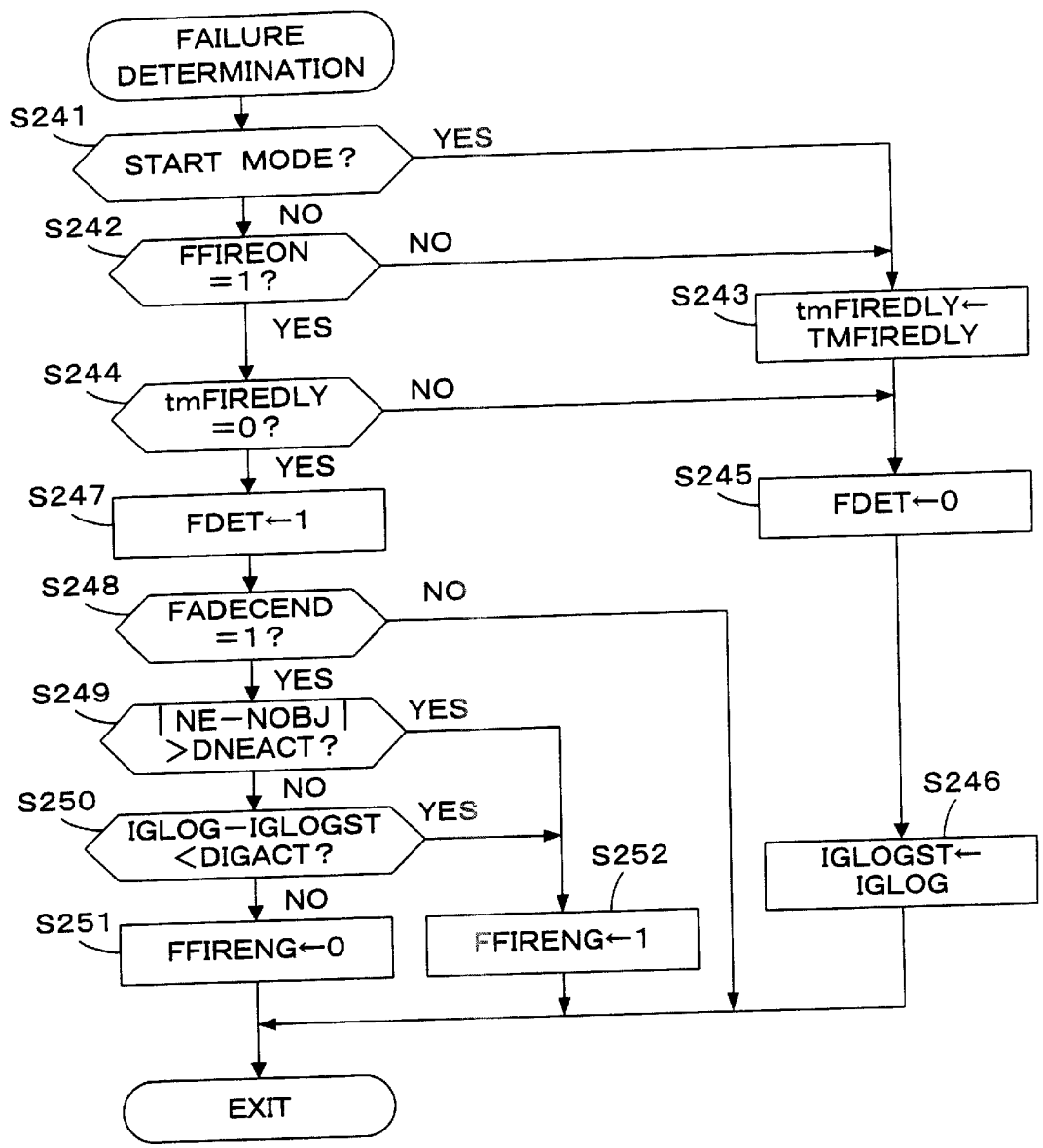
FIG. 19 is a flowchart showing a program for executing failure determination according to the second preferred embodiment.

FIG. 19 is a flowchart showing the failure determination processing in this preferred embodiment.

In step S241, it is determined whether or not the engine 1 is in the start mode, or cranking. If the engine 1 is cranking, a predetermined delay time TMFIREDLY (e.g., 2 seconds) is set in a delay downcount timer tmFIREDLY and this timer is started (step S243). Thereafter, the failure determination execution flag FDET is set to "0" (step S245), and the ignition timing IGLOG is stored as a stored value IGLOGST (step S246). Thereafter, the program is ended. To execute the failure determination during a period when a change in engine rotational speed NE is small, the predetermined delay time TMFIREDLY is set so that step S247 and the following steps are executed after the time when the FIRE mode target rotational speed NEFIR coincides with the normal target rotational speed NOBJ, for example (see FIGS. 20A and 20C).

If the engine 1 is not in the start mode in step S241, that is, if the engine 1 is running (self sustaining operation) after the completion of starting, it is determined whether or not the FIRE mode flag FFIREON is "1" (step S242). If FFIREON is "0", which indicates that the engine 1 is not in the FIRE mode, the program proceeds to step S243. If FFIREON is "1", it is determined whether or not the value of the timer tmFIREDLY started in step S243 is "0" (step S244). If tmFIREDLY is greater than "0", the program proceeds to step S245.

When tmFIREDLY equals 0, the failure determination execution flag FDET is set to "1" (step S247), and it is determined whether or not the decrease end flag FADECEND set in step S212 or S214 shown in FIG. 18 is "1" at step S248. If FADECEND is "0", the program is ended, when FADECEND is "1", the failure determination step consisting of steps S249 and S250 is executed. That is, it is determined whether or not the absolute value of the difference between the engine rotational speed NE and the target rotational speed NOBJ for the normal control is greater than a determination threshold DNEACT (e.g., 100 rpm) (step S249). If the absolute value of the difference between NE and NOBJ is greater than DNEACT, it is determined that there has occurred a failure in that the feedback control for controlling the ignition timing so that the engine rotational speed NE coincides with the target rotational speed NOBJ is not properly executed. Consequently, a failure flag FEIRENG is set to "1", indicating the occurrence of a failure in that the operation of the FIRE mode was not properly performed (step S252).

Figures 20A, 20B, 20C:
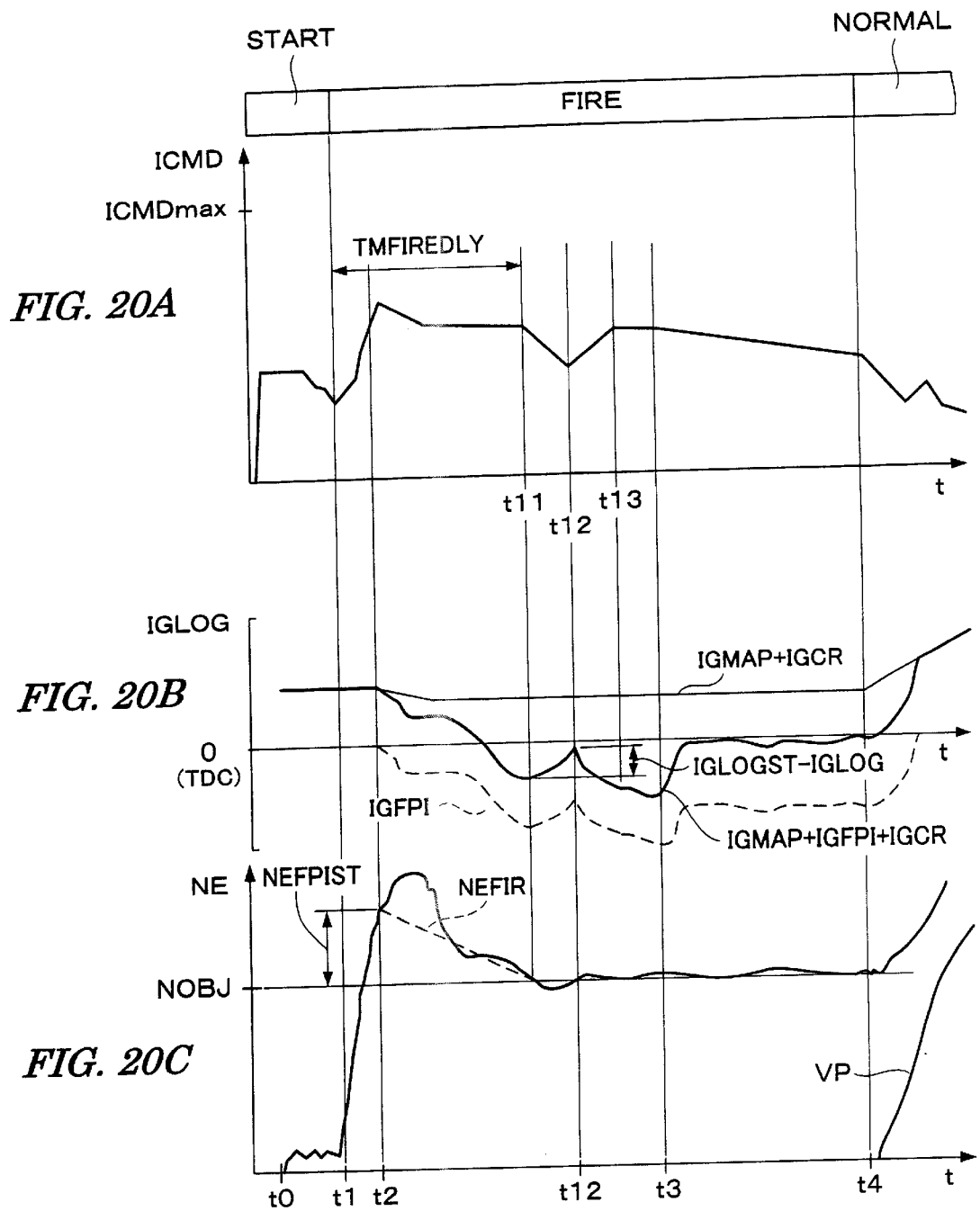
FIGS. 20A to 20C are time charts for illustrating the operation in executing the catalyst temperature rise acceleration control according to the second preferred embodiment.

If the absolute value of the difference between NE and NOBJ is less than or equal to DNEACT in step S249, it is determined whether or not the difference between the present ignition timing IGLOG and the ignition timing IGLOGST stored in step S246 immediately before entering the determination mode is less than a determination threshold DIGACT (step S250). If the control system is normal, the ignition timing IGLOG changes in the advance direction with a decrease in the intake air amount as shown in FIGS. 20A to 20C, so that the answer to step S250 becomes negative (NO). Then, the failure flag FFIRENG is set to "0" (step S251), and the program is ended. If the difference is less than DIGACT, it is determined that the ignition timing IGLOG is not properly changed in the advance direction and that a failure has occurred. Then, the program proceeds to step S252.

FIGS. 20A, 20B, and 20C are time charts for illustrating the intake air amount control and the ignition timing control in this preferred embodiment. More specifically, FIG. 20A shows changes in the valve opening control amount ICMD of the auxiliary air control valve 18, FIG. 20B shows changes in the ignition timing IGLOG, and FIG. 20C shows changes in the engine rotational speed NE.

In the example shown in FIGS. 20A to 20C, the engine 1 is started at the time t0 (i.e., cranking is started at the time t0), and a self-sustaining operation of the engine 1 begins at the time t1. At time t1, the FIRE mode is started. The engine rotational speed NE is increased after entering the FIRE mode, and the execution conditions of the feedback control for ignition timing are satisfied at the time t2. Then the feedback control, as mentioned above is started. The target rotational speed NEFIR for the FIRE mode is equal to the sum of NOBJ and NEFPIST, at the beginning of the FIRE mode, and is thereafter gradually decreased to the target rotational speed NOBJ for normal control.

The valve opening control amount ICMD is controlled so that it is gradually increased after starting the FIRE mode and then decreased. The failure determination execution flag FDET is set to "1" at the time t11 to enter the failure determination mode and start the processing for gradually decreasing the intake air amount. When the processing for gradually decreasing ends at the time t12, the failure determination steps (steps S249 and S250) in the failure determination processing (FIG. 19) are executed. Thereafter, the processing for gradual increasing the intake air amount is executed until the intake air amount is returned to its substantially original level at time t13. The failure determination mode also ends at time t13 (the failure determination execution flag FDET is returned to "0"). Immediately after the FIRE mode is ended at the time t4, the transient control is performed to gradually decrease the intake air amount.

The retard correction term IGFPI changes as shown by a broken line in FIG. 20B, and the ignition timing IGLOG is controlled to be retarded from the normal control value (IGMAP+IGCR). When the failure determination mode is started at the time t11, the retard correction term IGFPI initially increases (the retard amount decreases) with a decrease in the intake air amount. After the time t12, the retard correction term IGFPI decreases (the retard amount increases) with an increase in the intake air amount. Accordingly, the ignition timing IGLOG similarly changes. When the failure determination mode is ended at the time t13, the retard correction term IGFPI is returned to its substantially original level. When the shift position SFT is changed from the neutral position N to the in-gear condition at the time t3, the engine load increases and the retard correction term IGFPI is therefore increased (the retard amount is decreased) to increase the output torque of the engine 1. At the same time, the engine rotational speed NE is maintained at the target rotational speed NEFIR approximately equal to NOBJ. After the time t4, the ignition timing IGLOG is controlled to gradually approach the normal control value.

During the time period between t2 and t4, the engine rotational speed NE is controlled so as to coincide with the target rotational speed NEFIR by the feedback control. In the example shown in FIGS. 20A to 20C, the vehicle is started immediately after the time t4, and the vehicle speed VP gradually increases.

FIGS. 21A, 21B, and 21C are time charts showing changes in the valve opening control amount ICMD of the auxiliary air control valve 18, changes in the ignition timing IGLOG, and changes in the engine rotational speed NE, respectively, in the case that the failure has occurred. The valve opening control amount ICMD shown in FIG. 21A changes similarly to that shown in FIG. 20A. If there occurs a failure such that an actual intake air amount is not increased and the engine rotational speed NE gradually decreases, although the valve opening control amount ICMD is controlled as shown in FIG. 21A, the ignition timing IGLOG is maintained at a substantially constant value and the engine rotational speed NE falls outside a normal range of NOBJ plus or minus DNEACT for the target rotational speed, although the gradually decreasing processing for the valve opening control amount ICMD is executed in the failure determination mode (from the time t11 to the time t12). Therefore, it is determined that the failure has occurred.

In the second preferred embodiment described above, the valve opening control amount ICMD of the auxiliary air control valve 18 is gradually decreased to decrease the intake air amount during the execution of the FIRE mode control (temperature rise acceleration control of the three-way catalyst 16), and it is determined whether or not the FIRE mode control is properly executed according to the engine rotational speed NE and/or the ignition timing IGLOG while gradually decreasing the air intake amount. Accordingly, a failure such that the auxiliary air control valve 18 does not perform an actual valve opening operation according to the valve opening control amount ICMD, for example, can be quickly detected, and any failure in the catalyst temperature rise acceleration control can be diagnosed early to minimize the deterioration in exhaust emission characteristics.

In this preferred embodiment, the processing of FIG. 18 corresponds to part of the intake air amount control means, and the processing of FIG. 19 corresponds to part of the failure diagnosing means.

While the failure determination (steps S249 and S250 in FIG. 19) is executed at the time t12 when the processing that decreases the intake air amount is completed in this preferred embodiment, the failure determination step may be executed after a predetermined time period for stabilization of the control system has elapsed from the time of completion of the processing that decreased the intake air amount.

Third Preferred Embodiment

In this preferred embodiment, a temperature TCAT of the three-way catalyst 16 is detected, and an estimated temperature of the catalyst 16 is calculated. Then, failure diagnosis is performed according to the detected catalyst temperature TCAT and the estimated catalyst temperature. This preferred embodiment is similar to the first preferred embodiment except for the following differences described with reference to FIGS. 22 to 27.

Figure 22:
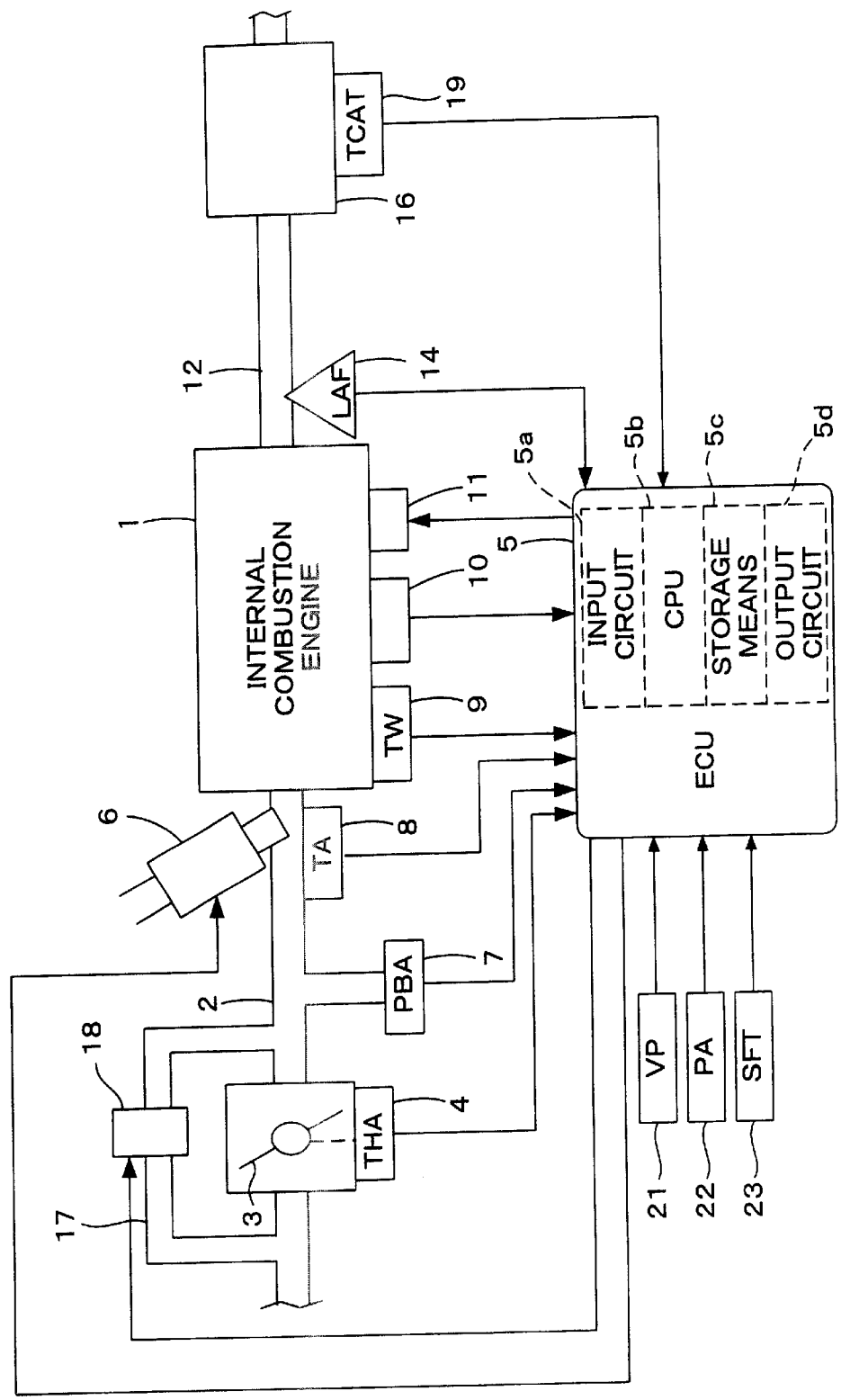
FIG. 22 is a schematic diagram showing the configuration of an internal combustion engine and a control system therefor according to a third preferred embodiment of the present invention.

FIG. 22 is a schematic diagram showing the configuration of a control system according to the third preferred embodiment. In this preferred embodiment, the three-way catalyst 16 is provided with a catalyst temperature sensor 19 as catalyst temperature detecting means for detecting a catalyst temperature TCAT, and a detection signal output from the catalyst temperature sensor 19 is supplied to the ECU 5.

Figure 23:
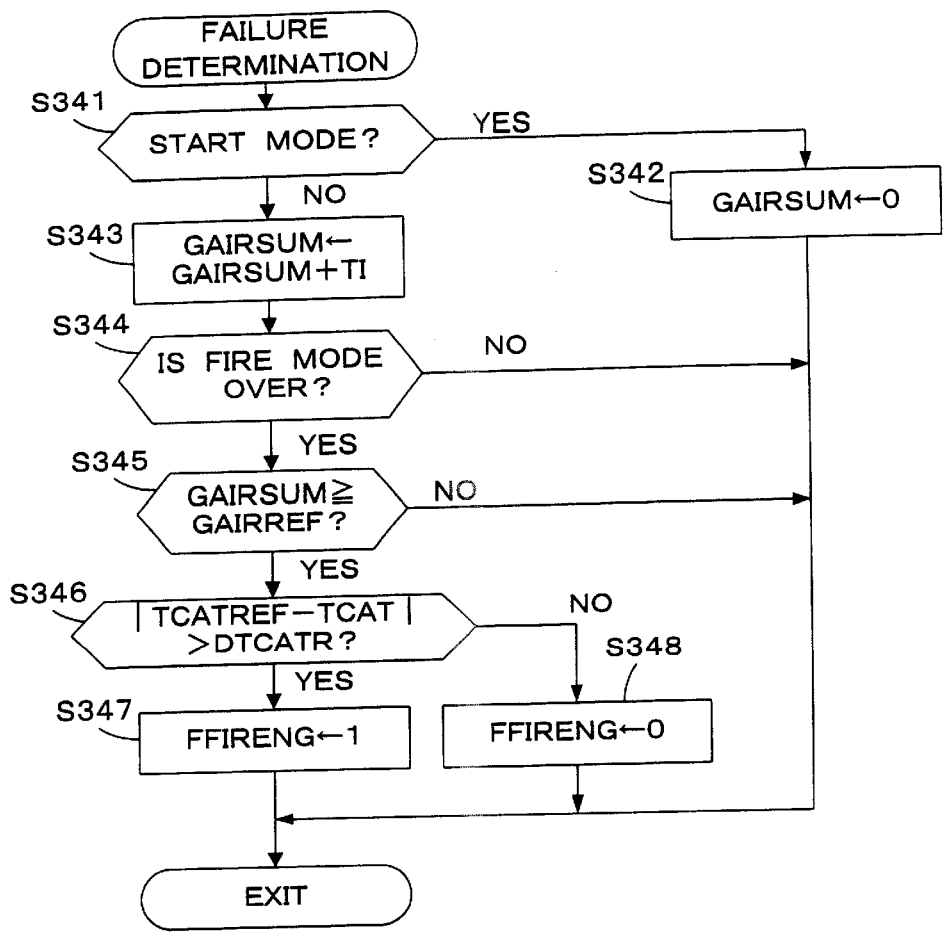
FIG. 23 is a flowchart showing a program for executing failure determination according to the third preferred embodiment.

FIG. 23 is a flowchart showing failure determination processing in this preferred embodiment.

In step S341, it is determined whether or not the engine 1 is in the start mode, or cranking. If the engine 1 is cranking, an accumulated intake air amount parameter GAIRSUM proportional to a value of the intake air amount accumulated after the start of the engine 1 is set to "0" (step S342), and the program is ended. If the cranking of the engine 1 has been finished, the basic fuel injection period T1 used for calculation of Eq. (1) mentioned above is applied to Eq. (10) shown below to update the accumulated intake air amount parameter GAIRSUM (step S343). As described above, the basic fuel injection period T1 is proportional to the intake air amount per unit time, so that accumulated intake air amount parameter GAIRSUM is obtained by accumulating the basic fuel injection period T1.

$$GAIRSUM=GAIRSUM+TI \qquad (10)$$

Thereafter, it is determined whether or not the FIRE mode control has been finished (step S344). If the FIRE mode control is in execution, the program is ended. If the FIRE mode control has been finished, it is determined whether or not the accumulated intake air amount parameter GAIR-SUM is greater than or equal to a predetermined amount GAIRREF, that is, whether or not the accumulated intake air amount after the start of the engine 1 has reached an amount required for raising of the catalyst temperature to a temperature at which the three-way catalyst 16 is activated by the FIRE mode control (step S345). If GAIRSUM is less than GAIRREF, the program ends. When GAIRSUM is greater than or equal to GAIRREF, it is determined whether or not the absolute value of the difference between TCATREF and TCAT is greater than a predetermined difference DTCATR (step S346). TCATREF is an estimated catalyst temperature corresponding to the time when the accumulated intake air amount parameter GAIRSUM equals GAIRREF. TCAT is the detected catalyst temperature. If the absolute value of the difference between TCATREF and TCAT is less than or equal to DTCATR, it is determined that the FIRE mode control has been properly executed. Therefore, a failure flag FFIRENG is set to "0", indicating that the operation of the FIRE mode was properly performed (step S348). Conversely, if the absolute value at the difference between TCATREF and TCAT is greater than DTCATR, it is determined that there has occurred a failure and that the operation of the FIRE mode was not properly performed. Consequently, the failure flag FFIRENG is set to "1" (step S347). Then, the program is ended.

Figure 24:
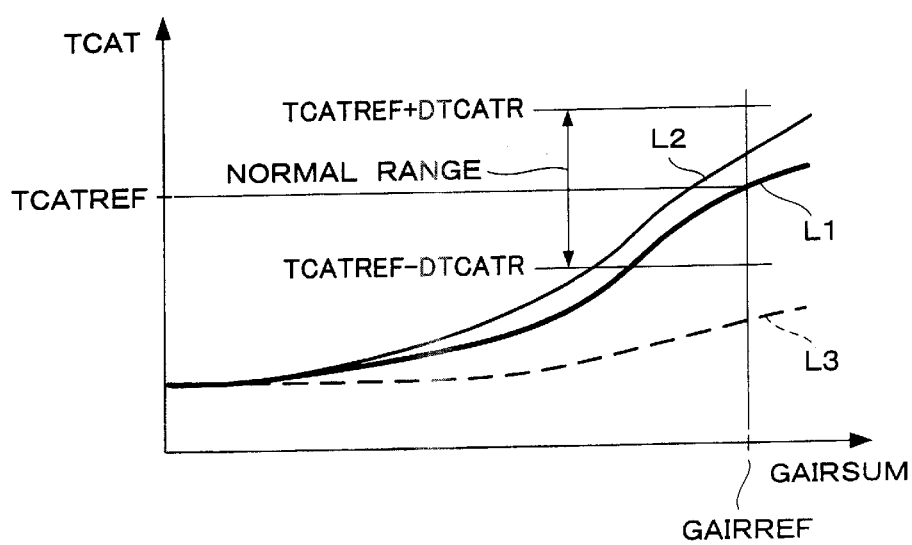
FIG. 24 is a graph showing the relation between an accumulated intake air amount parameter (GAIRSUM) and a catalyst temperature.

FIG. 24 is a graph showing the relation between the accumulated intake air amount parameter GAIRSUM and the catalyst temperature TCAT. In FIG. 24, the solid line L1 shows an estimated catalyst temperature estimated according to the accumulated intake air amount parameter GAIRSUM, the solid line L2 shows a temperature rise characteristic in the case that the operation of the FIRE mode is properly performed, and the broken line L3 shows a temperature rise characteristic in the case that the operation of the FIRE mode is not properly performed. According to the processing of FIG. 23, it is determined whether or not the detected catalyst temperature TCAT falls in the normal range shown at the time GAIRSUM becomes equal to GAIRREF. Accordingly, in the case shown by the broken line L3, it is determined that the failure has occurred. As a result, it is possible to quickly detect a failure such that the auxiliary air control valve 18 does not perform a valve opening operation according to the valve opening control amount ICMD, for example, thereby diagnosing early any trouble in the catalyst temperature rise acceleration control to minimize a deterioration in exhaust characteristics.

In this preferred embodiment, steps S342, S343, and S345 in FIG. 23 and setting of the estimated catalyst temperature TCATREF correspond to the catalyst temperature estimating means, and steps S346 and S347 in FIG. 23 correspond to the failure diagnosing means.

The third preferred embodiment may be modified as follows:

First Modification

Figure 25:
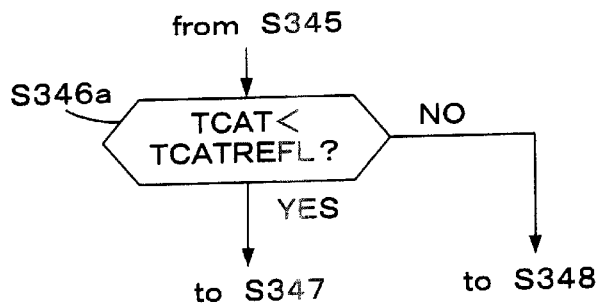
FIG. 25 is a flowchart for illustrating a modification of the processing shown in FIG. 23.

Step S346 in FIG. 23 may be replaced by step S346a shown in FIG. 25. In step S346a, it is determined whether or not the detected catalyst temperature TCAT is lower than an estimated lower-limit temperature TCATREFL, where TCATREFL equals TCATREF minus DTCATR. If TCAT is less than TCATREFL, it is determined that the failure has occurred, and the program proceeds to step S347, whereas if TCAT is higher than or equal to TCATREFL, it is determined that no failure has occurred, and the program proceeds to step S348.

In this modification, steps S342, S343, S345, and setting of the estimated lower-limit temperature TCATREFL in step S346a correspond to the catalyst temperature estimating means, and steps S346a and S347 correspond to the failure diagnosing means.

Second Modification

Figure 26:
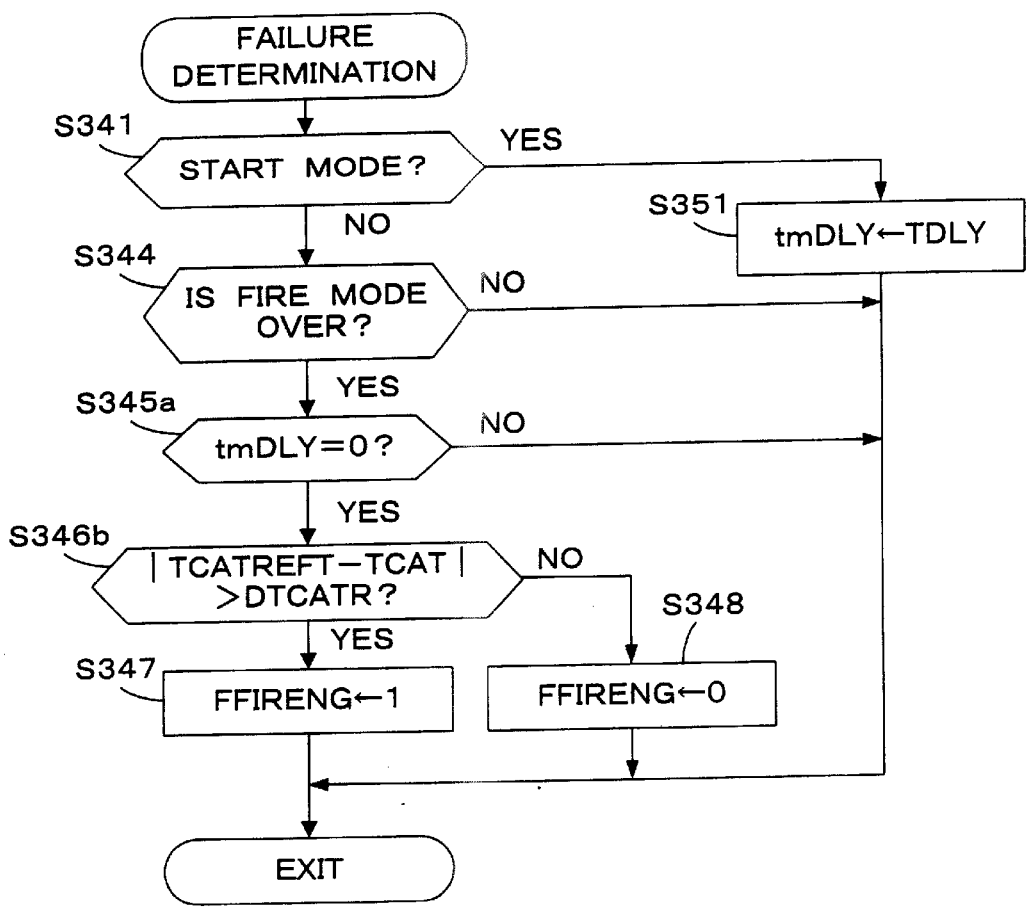
FIG. 26 is a flowchart for illustrating another modification of the processing shown in FIG. 23.

The processing of FIG. 23 may be modified as shown in FIG. 26 by removing step S343 shown in FIG. 23 and replacing steps S342, S345, and S346 shown in FIG. 23 by steps S351, S345a, and S346b, respectively.

In step S351, a predetermined delay time TDLY (e.g., 30 seconds) is set in a downcount timer tmDLY, and this timer is started. In step S345a, it is determined whether or not the value of the timer tmDLY is 0. If tmDLY is greater than 0, the program is ended. If tmDLY is 0, it is determined whether or not the absolute value of the difference between an estimated catalyst temperature TCATREFT corresponding to an average catalyst temperature after the elapse of the predetermined delay time TDLY from the start of the engine 1 and the detected catalyst temperature TCAT is greater than a predetermined difference DTCATR (step S346b). If this absolute value is less than or equal to DTCATR, it is determined that the FIRE mode control has been properly executed, and the program proceeds to step S348. When the absolute value of the difference between TCATREFT and TCAT is greater than DTCATR, it is determined that there has occurred a failure in that the operation of the FIRE mode was not properly performed, and the program proceeds to step S347.

In this modification, a catalyst temperature is estimated according to an elapsed time after the start of the engine 1. The failure diagnosis is performed on the basis of the estimated catalyst temperature TCATREFT after the elapse of the predetermined delay time TDLY. That is, in this modification, steps S351 and S345a and setting of the estimated catalyst temperature TCATREFT correspond to the catalyst temperature estimating means, and steps S346b and S347 correspond to the failure diagnosing means.

Third Modification

The processing of FIG. 26 may be modified as shown in FIG. 27 by exchanging between steps S345a and S346b shown in FIG. 26 and replacing step S346b by step S346a shown in FIG. 25. That is, in step S346a, it is determined whether or not the detected catalyst temperature TCAT is higher than the estimated lower-limit temperature TCATREFL. If TCAT is lower than or equal to TCATREFL, the program is ended. When TCAT is greater than TCATREFL, it is determined whether or not the value of the timer tmDLY is 0 (step S345a). If tmDLY is 0, it is determined that the failure has occurred, and the program proceeds to step S347. When tmDLY is greater than 0, it is determined that no failure has occurred, and the program proceeds to step S348.

In this modification, steps S351 and S346a and setting of the estimated lower-limit temperature TCATREFL correspond to the catalyst temperature estimating means, and steps S345a and S347 correspond to the failure diagnosing means.

Other Modifications

While the catalyst temperature sensor 19 is used as the catalyst temperature detecting means in the above preferred embodiment, the catalyst temperature sensor 19 may be replaced by an exhaust gas temperature sensor for detecting an exhaust gas temperature on the upstream side of the three-way catalyst 16.

What is claimed is:

1. A control system for an internal combustion engine having an exhaust system provided with a catalyst, said system comprising:

intake air amount control means for controlling an intake air amount to said engine;

ignition timing control means for controlling an ignition timing of said engine;

catalyst temperature raising means for increasing said intake air amount after starting of said engine and for retarding said ignition timing according to a rotational speed of said engine; and failure diagnosing means for diagnosing a failure of said catalyst temperature raising means when decreasing the intake air amount during the operation of said catalyst temperature raising means, wherein said failure diagnosing means determines that said catalyst temperature raising means has failed when an amount of change in said ignition timing is less than a predetermined amount.

2. A control system according to claim 1, wherein said failure diagnosing means determines that said catalyst temperature raising means has failed when the absolute value of the difference between the rotational speed of said engine and a predetermined rotational speed is greater than a predetermined value.

3. A control system for an internal combustion engine having an exhaust system provided with a catalyst, said system comprising:

an intake air amount control module for controlling an intake air amount to said engine;

an ignition timing control module for controlling an ignition timing of said engine;

a catalyst temperature raising module for increasing said intake air amount after starting of said engine and for retarding said ignition timing according to a rotational speed of said engine; and a failure diagnosing module for diagnosing a failure of said catalyst temperature raising module when decreasing the intake air amount during the operation of said catalyst temperature raising module, wherein said failure diagnosing module determines that said catalyst temperature raising module has failed when an amount of change in said ignition timing is less than a predetermined amount.

4. A control system according to claim 3, wherein said failure diagnosing module determines that said catalyst temperature raising module has failed when the absolute value of the difference between the rotational speed of said engine and a predetermined rotational speed is greater than a predetermined value.

5. A computer program for causing a computer to carry out a method for diagnosing a failure in controlling an internal combustion engine having an exhaust system provided with a catalyst, said method comprising the steps of:

a) executing a catalyst temperature raising control of increasing an intake air amount to said engine after starting of said engine, and retarding an ignition timing of said engine according to a rotational speed of said engine; and b) diagnosing a failure in said catalyst temperature raising control when decreasing the intake air amount during the execution of said catalyst temperature raising control, wherein it is determined that a failure has occurred in said catalyst temperature raising control when an amount of change in said ignition timing is less than a predetermined amount.

6. A computer program according to claim 5, wherein it is determined that a failure has occurred in said catalyst temperature raising control when the absolute value of the difference between the rotational speed of said engine and a predetermined rotational speed is greater than a predetermined value.

* * * * *